US012420202B2

(12) United States Patent
Zien

(10) Patent No.: US 12,420,202 B2
(45) Date of Patent: *Sep. 23, 2025

(54) SYSTEM AND METHOD FOR PROVIDING CONDITIONAL ACCESS TO VIRTUAL GAMING ITEMS

(71) Applicant: Activision Publishing, Inc., Santa Monica, CA (US)

(72) Inventor: Brandon Myles Zien, Sherman Oaks, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,505

(22) Filed: Jul. 31, 2023

(65) Prior Publication Data

US 2023/0372823 A1 Nov. 23, 2023

Related U.S. Application Data

(63) Continuation of application No. 17/086,594, filed on Nov. 2, 2020, now Pat. No. 11,712,627.

(Continued)

(51) Int. Cl.

*A63F 13/73* (2014.01)
*A63F 13/533* (2014.01)

(Continued)

(52) U.S. Cl.

CPC ............ *A63F 13/73* (2014.09); *A63F 13/533* (2014.09); *A63F 13/69* (2014.09); *A63F 13/80* (2014.09);

(Continued)

(58) Field of Classification Search

CPC ...... G06Q 50/01; G06Q 20/145; G06N 3/006; A63F 2300/575; A63F 2300/5553;

(Continued)

(56) References Cited

U.S. PATENT DOCUMENTS

| | | | |
|---|---|---|---|
| 4,461,301 | A | 7/1984 | Ochs |
| 4,908,761 | A | 3/1990 | Tai |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

(Continued)

*Primary Examiner* — William H McCulloch, Jr.
(74) *Attorney, Agent, or Firm* — Novel IP

(57) ABSTRACT

The present specification describes a system and method for providing conditional access to a virtual gaming item possessed by a first player of a video game to a second player. The method includes: creating a database of conditionally accessible virtual items, wherein said accessibility is determined based on at least one predefined condition; modifying an attribute of the virtual item for making the second player aware that said item is available for conditional access for a predefined period of time; fulfilling, by the second player, at least one access condition; and providing accessibility to the item to the second player for the predefined period of time.

19 Claims, 16 Drawing Sheets

Related U.S. Application Data

(60) Provisional application No. 62/933,209, filed on Nov. 8, 2019.

(51) Int. Cl.
*A63F 13/69* (2014.01)
*A63F 13/80* (2014.01)

(52) U.S. Cl.
CPC . *A63F 2300/5533* (2013.01); *A63F 2300/575* (2013.01); *A63F 2300/638* (2013.01)

(58) Field of Classification Search
CPC ........ A63F 13/75; A63F 13/822; A63F 13/69; A63F 13/73
See application file for complete search history.

(56) References Cited

U.S. PATENT DOCUMENTS 5,031,089 A 7/1991 Liu
5,058,180 A 10/1991 Khan
5,365,360 A 11/1994 Torres
5,371,673 A 12/1994 Fan
5,432,934 A 7/1995 Levin
5,442,569 A 8/1995 Osano
5,442,780 A 8/1995 Takanashi
5,493,692 A 2/1996 Theimer
5,497,186 A 3/1996 Kawasaki
5,506,902 A 4/1996 Kubota
5,530,796 A 6/1996 Wang
5,539,883 A 7/1996 Allon
5,561,736 A 10/1996 Moore
5,563,946 A 10/1996 Cooper
5,606,702 A 2/1997 Diel
5,630,129 A 5/1997 Wheat
5,685,775 A 11/1997 Bakoglu
5,694,616 A 12/1997 Johnson
5,706,507 A 1/1998 Schloss
5,708,764 A 1/1998 Borrel
5,726,883 A 3/1998 Levine
5,734,898 A 3/1998 He
5,736,985 A 4/1998 Lection
5,736,990 A 4/1998 Barrus
5,737,416 A 4/1998 Cooper
5,737,533 A 4/1998 De
5,745,113 A 4/1998 Jordan
5,745,678 A 4/1998 Herzberg
5,758,079 A 5/1998 Ludwig
5,761,083 A 6/1998 Brown
5,762,552 A 6/1998 Vuong
5,768,511 A 6/1998 Galvin
5,774,668 A 6/1998 Choquier
5,793,365 A 8/1998 Tang
5,825,877 A 10/1998 Dan
5,828,839 A 10/1998 Moncreiff
5,835,094 A 11/1998 Ermel
5,835,692 A 11/1998 Cragun
5,860,137 A 1/1999 Raz
5,877,763 A 3/1999 Berry
5,878,233 A 3/1999 Schloss
5,880,731 A 3/1999 Liles
5,883,628 A 3/1999 Mullaly
5,900,879 A 5/1999 Berry
5,903,266 A 5/1999 Berstis
5,903,271 A 5/1999 Bardon
5,911,045 A 6/1999 Leyba
5,920,325 A 7/1999 Morgan
5,920,692 A 7/1999 Nguyen
5,920,848 A 7/1999 Schutzer
5,923,324 A 7/1999 Berry
5,926,100 A 7/1999 Escolar
5,933,818 A 8/1999 Kasravi
5,933,849 A 8/1999 Srbljic
5,938,722 A 8/1999 Johnson
5,956,038 A * 9/1999 Rekimoto ............ A63F 13/352
345/419
5,958,014 A 9/1999 Cave
5,969,724 A 10/1999 Berry
5,977,979 A 11/1999 Clough
5,983,003 A 11/1999 Lection
5,990,887 A 11/1999 Redpath
5,990,888 A 11/1999 Blades
6,006,034 A 12/1999 Heath
6,006,223 A 12/1999 Agrawal
6,008,848 A 12/1999 Tiwari
6,009,455 A 12/1999 Doyle
6,009,458 A 12/1999 Hawkins
6,012,096 A 1/2000 Link
6,014,145 A 1/2000 Bardon
6,018,734 A 1/2000 Zhang
6,021,268 A 2/2000 Johnson
6,021,496 A 2/2000 Dutcher
6,023,729 A 2/2000 Samuel
6,025,839 A 2/2000 Schell
6,032,129 A 2/2000 Greef
6,049,819 A 4/2000 Buckle
6,058,266 A 5/2000 Megiddo
6,059,842 A 5/2000 Dumarot
6,061,722 A 5/2000 Lipa
6,067,355 A 5/2000 Lim
6,069,632 A 5/2000 Mullaly
6,070,143 A 5/2000 Barney
6,076,093 A 6/2000 Pickering
6,081,270 A 6/2000 Berry
6,081,271 A 6/2000 Bardon
6,088,727 A 7/2000 Hosokawa
6,088,732 A 7/2000 Smith
6,091,410 A 7/2000 Lection
6,094,196 A 7/2000 Berry
6,098,056 A 8/2000 Rusnak
6,098,093 A 8/2000 Bayeh
6,101,538 A 8/2000 Brown
6,104,406 A 8/2000 Berry
6,105,008 A 8/2000 Davis
6,108,420 A 8/2000 Larose
6,111,581 A 8/2000 Berry
6,115,718 A 9/2000 Huberman
6,119,229 A 9/2000 Martinez
6,134,588 A 10/2000 Guenthner
6,135,646 A 10/2000 Kahn
6,138,128 A 10/2000 Perkowitz
6,138,152 A 10/2000 Jalote
6,141,699 A 10/2000 Luzzi
6,144,381 A 11/2000 Lection
6,148,294 A 11/2000 Beyda
6,148,299 A 11/2000 Yoshimoto
6,148,328 A 11/2000 Cuomo
6,154,811 A 11/2000 Srbljic
6,157,953 A 12/2000 Chang
6,170,013 B1 1/2001 Murata
6,177,932 B1 1/2001 Galdes
6,179,713 B1 1/2001 James
6,182,067 B1 1/2001 Presnell
6,182,077 B1 1/2001 Tokumine
6,185,614 B1 2/2001 Cuomo
6,195,657 B1 2/2001 Rucker
6,199,059 B1 3/2001 Dahan
6,199,067 B1 3/2001 Geller
6,201,881 B1 3/2001 Masuda
6,205,481 B1 3/2001 Heddaya
6,212,494 B1 4/2001 Boguraev
6,212,548 B1 4/2001 Desimone
6,216,098 B1 4/2001 Clancey
6,219,675 B1 4/2001 Pal
6,219,676 B1 4/2001 Reiner
6,222,551 B1 4/2001 Schneider
6,226,686 B1 5/2001 Rothschild
6,233,583 B1 5/2001 Hoth
6,249,779 B1 6/2001 Hitt
6,266,649 B1 7/2001 Linden
6,270,416 B1 8/2001 Komoto
6,271,842 B1 8/2001 Bardon
6,271,843 B1 8/2001 Lection

(56) References Cited

U.S. PATENT DOCUMENTS

| | | | |
|---|---|---|---|
| 6,275,820 | B1 | 8/2001 | Navin-Chandra |
| 6,282,547 | B1 | 8/2001 | Hirsch |
| 6,292,835 | B1 | 9/2001 | Huang |
| 6,293,865 | B1 | 9/2001 | Kelly |
| 6,301,609 | B1 | 10/2001 | Aravamudan et al. |
| 6,308,208 | B1 | 10/2001 | Jung |
| 6,311,206 | B1 | 10/2001 | Malkin |
| 6,314,465 | B1 | 11/2001 | Paul |
| 6,321,236 | B1 | 11/2001 | Zollinger |
| 6,330,281 | B1 | 12/2001 | Mann |
| 6,334,127 | B1 | 12/2001 | Bieganski |
| 6,334,141 | B1 | 12/2001 | Varma |
| 6,336,134 | B1 | 1/2002 | Varma |
| 6,337,700 | B1 | 1/2002 | Kinoe |
| 6,343,738 | B1 | 2/2002 | Ogilvie |
| 6,345,264 | B1 | 2/2002 | Breese |
| 6,345,287 | B1 | 2/2002 | Fong |
| 6,349,091 | B1 | 2/2002 | Li |
| 6,351,775 | B1 | 2/2002 | Yu |
| 6,353,449 | B1 | 3/2002 | Gregg |
| 6,356,297 | B1 | 3/2002 | Cheng |
| 6,360,254 | B1 | 3/2002 | Linden |
| 6,363,174 | B1 | 3/2002 | Lu |
| 6,366,285 | B1 | 4/2002 | Brush |
| 6,370,560 | B1 | 4/2002 | Robertazzi |
| 6,396,513 | B1 | 5/2002 | Helfman |
| 6,397,080 | B1 | 5/2002 | Viktorsson |
| 6,404,426 | B1 | 6/2002 | Weaver |
| 6,411,312 | B1 | 6/2002 | Sheppard |
| 6,418,424 | B1 | 7/2002 | Hoffberg |
| 6,418,462 | B1 | 7/2002 | Xu |
| 6,421,047 | B1 | 7/2002 | De |
| 6,426,757 | B1 | 7/2002 | Smith |
| 6,445,389 | B1 | 9/2002 | Bossen |
| 6,449,518 | B1 | 9/2002 | Yokoo |
| 6,452,593 | B1 | 9/2002 | Challener |
| 6,462,760 | B1 | 10/2002 | Cox, Jr. |
| 6,463,078 | B1 | 10/2002 | Engstrom |
| 6,466,550 | B1 | 10/2002 | Foster |
| 6,469,712 | B1 | 10/2002 | Hilpert, Jr. |
| 6,473,085 | B1 | 10/2002 | Brock |
| 6,473,103 | B1 | 10/2002 | Bailey |
| 6,473,597 | B1 | 10/2002 | Johnson |
| 6,476,830 | B1 | 11/2002 | Farmer |
| 6,499,053 | B1 | 12/2002 | Marquette |
| 6,501,834 | B1 | 12/2002 | Milewski |
| 6,505,208 | B1 | 1/2003 | Kanevsky |
| 6,509,925 | B1 | 1/2003 | Dermler |
| 6,525,731 | B1 | 2/2003 | Suits |
| 6,539,415 | B1 | 3/2003 | Mercs |
| 6,549,933 | B1 | 4/2003 | Barrett |
| 6,559,863 | B1 | 5/2003 | Megiddo |
| 6,567,109 | B1 | 5/2003 | Todd |
| 6,567,813 | B1 | 5/2003 | Zhu |
| 6,574,477 | B1 | 6/2003 | Rathunde |
| 6,580,981 | B1 | 6/2003 | Masood |
| 6,591,250 | B1 | 7/2003 | Johnson |
| 6,594,673 | B1 | 7/2003 | Smith |
| 6,601,084 | B1 | 7/2003 | Bhaskaran |
| 6,618,751 | B1 | 9/2003 | Challenger |
| 6,640,230 | B1 | 10/2003 | Alexander |
| 6,641,481 | B1 | 11/2003 | Mai |
| 6,645,153 | B2 | 11/2003 | Kroll |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,694,306 | B1 | 2/2004 | Nishizawa |
| 6,717,600 | B2 | 4/2004 | Dutta |
| 6,734,884 | B1 | 5/2004 | Berry |
| 6,742,032 | B1 | 5/2004 | Castellani |
| 6,745,236 | B1 | 6/2004 | Hawkins |
| 6,765,596 | B2 | 7/2004 | Lection |
| 6,781,607 | B1 | 8/2004 | Benham |
| 6,798,407 | B1 | 9/2004 | Benman |
| 6,801,930 | B1 | 10/2004 | Dionne |
| 6,807,562 | B1 | 10/2004 | Pennock |
| 6,810,418 | B1 | 10/2004 | Shah |
| 6,819,669 | B2 | 11/2004 | Rooney |
| 6,832,239 | B1 | 12/2004 | Kraft |
| 6,836,480 | B2 | 12/2004 | Basso |
| 6,845,389 | B1 | 1/2005 | Sen |
| 6,854,007 | B1 | 2/2005 | Hammond |
| 6,886,026 | B1 | 4/2005 | Hanson |
| 6,901,379 | B1 | 5/2005 | Balter |
| 6,941,236 | B2 | 9/2005 | Huelsbergen |
| 6,948,168 | B1 | 9/2005 | Kuprionas |
| 6,954,728 | B1 | 10/2005 | Kusumoto |
| 6,954,906 | B1 | 10/2005 | Kamachi |
| RE38,865 | E | 11/2005 | Dumarot |
| 6,970,929 | B2 | 11/2005 | Bae |
| 6,993,596 | B2 | 1/2006 | Hinton |
| 7,006,616 | B1 | 2/2006 | Christofferson |
| 7,028,296 | B2 | 4/2006 | Irfan |
| 7,031,473 | B2 | 4/2006 | Morais |
| 7,050,868 | B1 | 5/2006 | Graepel |
| 7,062,533 | B2 | 6/2006 | Brown |
| 7,089,083 | B2 | 8/2006 | Yokoo |
| 7,089,266 | B2 | 8/2006 | Stolte |
| 7,124,071 | B2 | 10/2006 | Rich |
| 7,124,164 | B1 | 10/2006 | Chemtob |
| 7,139,792 | B1 | 11/2006 | Mishra |
| 7,143,409 | B2 | 11/2006 | Herrero |
| 7,159,217 | B2 | 1/2007 | Pulsipher |
| 7,185,067 | B1 | 2/2007 | Viswanath |
| 7,192,352 | B2 | 3/2007 | Walker |
| 7,209,137 | B2 | 4/2007 | Brokenshire |
| 7,230,616 | B2 | 6/2007 | Taubin |
| 7,240,093 | B1 | 7/2007 | Danieli |
| 7,249,123 | B2 | 7/2007 | Elder |
| 7,249,139 | B2 | 7/2007 | Chuah |
| 7,250,944 | B2 | 7/2007 | Anderson |
| 7,251,622 | B2 | 7/2007 | Yan |
| 7,263,511 | B2 | 8/2007 | Bodin |
| 7,278,108 | B2 | 10/2007 | Duarte |
| 7,287,053 | B2 | 10/2007 | Bodin |
| 7,292,870 | B2 | 11/2007 | Heredia |
| 7,305,438 | B2 | 12/2007 | Christensen |
| 7,308,476 | B2 | 12/2007 | Mannaru |
| 7,314,411 | B2 | 1/2008 | Lannert |
| 7,328,242 | B1 | 2/2008 | McCarthy |
| 7,353,295 | B1 | 4/2008 | Crow |
| 7,376,474 | B2 | 5/2008 | Graepel |
| 7,383,307 | B2 | 6/2008 | Kirkland |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,180 | B2 | 12/2008 | Kaufman |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,509,388 | B2 | 3/2009 | Allen |
| 7,512,548 | B1 | 3/2009 | Bezos |
| 7,515,136 | B1 | 4/2009 | Kanevsky |
| 7,517,282 | B1 | 4/2009 | Pryor |
| 7,525,964 | B2 | 4/2009 | Astley |
| 7,527,191 | B2 | 5/2009 | Takayama |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,590,984 | B2 | 9/2009 | Kaufman |
| 7,593,864 | B2 | 9/2009 | Shuster |
| 7,596,596 | B2 | 9/2009 | Chen |

(56) References Cited

U.S. PATENT DOCUMENTS

| | | | |
|---|---|---|---|
| 7,614,955 | B2 | 11/2009 | Farnham |
| 7,617,283 | B2 | 11/2009 | Aaron |
| 7,640,587 | B2 | 12/2009 | Fox |
| 7,657,340 | B2 | 2/2010 | Lind |
| 7,667,701 | B2 | 2/2010 | Leah |
| 7,677,970 | B2 | 3/2010 | O'Kelley, II |
| 7,698,656 | B2 | 4/2010 | Srivastava |
| 7,702,730 | B2 | 4/2010 | Spataro |
| 7,702,784 | B2 | 4/2010 | Berstis |
| 7,713,116 | B2 | 5/2010 | Keam |
| 7,714,867 | B2 | 5/2010 | Doi |
| 7,719,532 | B2 | 5/2010 | Schardt |
| 7,719,535 | B2 | 5/2010 | Tadokoro |
| 7,729,951 | B2 | 6/2010 | Dawson |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,770,114 | B2 | 8/2010 | Sriprakash |
| 7,773,087 | B2 | 8/2010 | Fowler |
| 7,774,407 | B2 | 8/2010 | Daly |
| 7,780,525 | B2 | 8/2010 | Walker |
| 7,780,532 | B2 | 8/2010 | Van |
| 7,782,318 | B2 | 8/2010 | Shearer |
| 7,792,263 | B2 | 9/2010 | Bruce |
| 7,792,801 | B2 | 9/2010 | Hamilton, II |
| 7,792,808 | B2 | 9/2010 | Stuart |
| 7,796,128 | B2 | 9/2010 | Radzikowski |
| 7,797,168 | B2 | 9/2010 | Kusumoto |
| 7,801,228 | B2 | 9/2010 | Lehne |
| 7,805,680 | B2 | 9/2010 | Meyers |
| 7,808,500 | B2 | 10/2010 | Shearer |
| 7,814,152 | B2 | 10/2010 | McGowan |
| 7,824,253 | B2 | 11/2010 | Thompson |
| 7,827,318 | B2 | 11/2010 | Hinton |
| 7,843,471 | B2 | 11/2010 | Doan |
| 7,844,663 | B2 | 11/2010 | Boutboul |
| 7,844,673 | B2 | 11/2010 | Bostick |
| 7,846,024 | B2 | 12/2010 | Graepel |
| 7,847,799 | B2 | 12/2010 | Taubin |
| 7,853,594 | B2 | 12/2010 | Elder |
| 7,856,469 | B2 | 12/2010 | Chen |
| 7,865,393 | B2 | 1/2011 | Leason |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,955,171 | B2 | 6/2011 | Jorasch |
| 7,958,047 | B2 | 6/2011 | Jung |
| 7,958,055 | B2 | 6/2011 | Hsu |
| 7,962,751 | B2 | 6/2011 | Dudley |
| 7,970,837 | B2 | 6/2011 | Lyle |
| 7,970,840 | B2 | 6/2011 | Cannon |
| 7,985,132 | B2 | 7/2011 | Walker |
| 7,985,138 | B2 | 7/2011 | Acharya |
| 7,990,387 | B2 | 8/2011 | Hamilton, II |
| 7,996,164 | B2 | 8/2011 | Hamilton, II |
| 7,996,264 | B2 | 8/2011 | Kusumoto |
| 7,997,987 | B2 | 8/2011 | Johnson |
| 8,001,161 | B2 | 8/2011 | George |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |
| 8,022,950 | B2 | 9/2011 | Brown |
| 8,026,913 | B2 | 9/2011 | Garbow |
| 8,028,021 | B2 | 9/2011 | Reisinger |
| 8,028,022 | B2 | 9/2011 | Brownholtz |
| 8,037,416 | B2 | 10/2011 | Bates |
| 8,041,614 | B2 | 10/2011 | Bhogal |
| 8,046,700 | B2 | 10/2011 | Bates |
| 8,051,462 | B2 | 11/2011 | Hamilton, II |
| 8,055,656 | B2 | 11/2011 | Cradick |
| 8,056,121 | B2 | 11/2011 | Hamilton, II |
| 8,057,307 | B2 | 11/2011 | Berstis |
| 8,062,130 | B2 | 11/2011 | Smith |
| 8,063,905 | B2 | 11/2011 | Brown |
| 8,070,601 | B2 | 12/2011 | Acharya |
| 8,082,245 | B2 | 12/2011 | Bates |
| 8,085,267 | B2 | 12/2011 | Brown |
| 8,089,481 | B2 | 1/2012 | Shearer |
| 8,092,288 | B2 | 1/2012 | Theis |
| 8,095,881 | B2 | 1/2012 | Reisinger |
| 8,099,338 | B2 | 1/2012 | Betzler |
| 8,099,668 | B2 | 1/2012 | Garbow |
| 8,102,334 | B2 | 1/2012 | Brown |
| 8,103,640 | B2 | 1/2012 | Lo |
| 8,103,959 | B2 | 1/2012 | Cannon |
| 8,105,165 | B2 | 1/2012 | Karstens |
| 8,108,774 | B2 | 1/2012 | Finn |
| 8,113,959 | B2 | 2/2012 | De Judicibus |
| 8,117,551 | B2 | 2/2012 | Cheng |
| 8,125,485 | B2 | 2/2012 | Brown |
| 8,127,235 | B2 | 2/2012 | Haggar |
| 8,127,236 | B2 | 2/2012 | Hamilton, II |
| 8,128,487 | B2 | 3/2012 | Hamilton, II |
| 8,131,740 | B2 | 3/2012 | Cradick |
| 8,132,235 | B2 | 3/2012 | Bussani |
| 8,134,560 | B2 | 3/2012 | Bates |
| 8,139,060 | B2 | 3/2012 | Brown |
| 8,139,780 | B2 | 3/2012 | Shearer |
| 8,140,340 | B2 | 3/2012 | Bhogal |
| 8,140,620 | B2 | 3/2012 | Creamer |
| 8,140,978 | B2 | 3/2012 | Betzler |
| 8,140,982 | B2 | 3/2012 | Hamilton, II |
| 8,145,676 | B2 | 3/2012 | Bhogal |
| 8,145,725 | B2 | 3/2012 | Dawson |
| 8,149,241 | B2 | 4/2012 | Do |
| 8,151,191 | B2 | 4/2012 | Nicol, II |
| 8,156,184 | B2 | 4/2012 | Kurata |
| 8,165,350 | B2 | 4/2012 | Fuhrmann |
| 8,171,407 | B2 | 5/2012 | Huang |
| 8,171,408 | B2 | 5/2012 | Dawson |
| 8,171,559 | B2 | 5/2012 | Hamilton, II |
| 8,174,541 | B2 | 5/2012 | Greene |
| 8,176,421 | B2 | 5/2012 | Dawson |
| 8,176,422 | B2 | 5/2012 | Bergman |
| 8,184,092 | B2 | 5/2012 | Cox |
| 8,184,116 | B2 | 5/2012 | Finn |
| 8,185,450 | B2 | 5/2012 | Mcvey |
| 8,185,829 | B2 | 5/2012 | Cannon |
| 8,187,067 | B2 | 5/2012 | Hamilton, II |
| 8,199,145 | B2 | 6/2012 | Hamilton, II |
| 8,203,561 | B2 | 6/2012 | Carter |
| 8,214,335 | B2 | 7/2012 | Hamilton, II |
| 8,214,433 | B2 | 7/2012 | Dawson |
| 8,214,750 | B2 | 7/2012 | Hamilton, II |
| 8,214,751 | B2 | 7/2012 | Dawson |
| 8,217,953 | B2 | 7/2012 | Comparan |
| 8,219,616 | B2 | 7/2012 | Dawson |
| 8,230,045 | B2 | 7/2012 | Kawachiya |
| 8,230,338 | B2 | 7/2012 | Dugan |
| 8,233,005 | B2 | 7/2012 | Finn |
| 8,234,234 | B2 | 7/2012 | Shearer |
| 8,234,579 | B2 | 7/2012 | Do |
| 8,239,775 | B2 | 8/2012 | Beverland |
| 8,241,131 | B2 | 8/2012 | Bhogal |
| 8,245,241 | B2 | 8/2012 | Hamilton, II |
| 8,245,283 | B2 | 8/2012 | Dawson |

(56) References Cited

U.S. PATENT DOCUMENTS

| | | | | |
|---|---|---|---|---|
| 8,265,253 | B2 | 9/2012 | Bruce | |
| 8,310,497 | B2 | 11/2012 | Comparan | |
| 8,313,364 | B2 | 11/2012 | Reynolds | |
| 8,334,871 | B2 | 12/2012 | Hamilton, II | |
| 8,360,886 | B2 | 1/2013 | Karstens | |
| 8,364,804 | B2 | 1/2013 | Childress | |
| 8,370,370 | B2 | 2/2013 | Huang | |
| 8,425,326 | B2 | 4/2013 | Chudley | |
| 8,442,946 | B2 | 5/2013 | Hamilton, II | |
| 8,489,925 | B1 | 7/2013 | Antukh | |
| 8,496,531 | B2 | 7/2013 | Youm | |
| 8,506,372 | B2 | 8/2013 | Chudley | |
| 8,514,249 | B2 | 8/2013 | Hamilton, II | |
| 8,554,841 | B2 | 10/2013 | Kurata | |
| 8,607,142 | B2 | 12/2013 | Bergman | |
| 8,607,356 | B2 | 12/2013 | Hamilton, II | |
| 8,624,903 | B2 | 1/2014 | Hamilton, II | |
| 8,626,836 | B2 | 1/2014 | Dawson | |
| 8,692,835 | B2 | 4/2014 | Hamilton, II | |
| 8,696,465 | B2 | 4/2014 | Gatto | |
| 8,721,412 | B2 | 5/2014 | Chudley | |
| 8,777,754 | B1 | 7/2014 | Santini | |
| 8,827,816 | B2 | 9/2014 | Bhogal | |
| 8,838,640 | B2 | 9/2014 | Bates | |
| 8,849,917 | B2 | 9/2014 | Dawson | |
| 8,888,598 | B2 | 11/2014 | Mehta | |
| 8,911,296 | B2 | 12/2014 | Chudley | |
| 8,924,308 | B1 | 12/2014 | Mehta | |
| 8,992,316 | B2 | 3/2015 | Smith | |
| 9,083,654 | B2 | 7/2015 | Dawson | |
| 9,152,914 | B2 | 10/2015 | Haggar | |
| 9,205,328 | B2 | 12/2015 | Bansi | |
| 9,286,731 | B2 | 3/2016 | Hamilton, II | |
| 9,299,080 | B2 | 3/2016 | Dawson | |
| 9,311,741 | B2 * | 4/2016 | Rogers | G06Q 20/145 |
| 9,320,971 | B2 * | 4/2016 | de Jesus | A63F 13/822 |
| 9,364,746 | B2 | 6/2016 | Chudley | |
| 9,438,680 | B1 | 9/2016 | Bingham, Jr. | |
| 9,508,222 | B1 | 11/2016 | Mclellan | |
| 9,525,746 | B2 | 12/2016 | Bates | |
| 9,542,812 | B2 | 1/2017 | Guinn | |
| 9,583,109 | B2 | 2/2017 | Kurata | |
| 9,682,324 | B2 | 6/2017 | Bansi | |
| 9,764,244 | B2 | 9/2017 | Bansi | |
| 9,789,406 | B2 | 10/2017 | Marr | |
| 9,795,887 | B2 | 10/2017 | Lin | |
| 9,808,722 | B2 * | 11/2017 | Kawachiya | G06N 3/006 |
| 9,827,488 | B2 | 11/2017 | Pearce | |
| 9,942,013 | B2 | 4/2018 | Malladi | |
| 10,118,099 | B2 | 11/2018 | Condrey | |
| 10,242,413 | B2 * | 3/2019 | Dange | G06T 19/00 |
| 10,386,988 | B1 | 8/2019 | Koh | |
| 10,402,731 | B1 | 9/2019 | Cosic | |
| 10,740,804 | B2 * | 8/2020 | Spivack | G06F 3/04815 |
| 10,963,648 | B1 * | 3/2021 | Bill | H04L 51/10 |
| 10,981,069 | B2 * | 4/2021 | Kawachiya | A63F 13/30 |
| 11,712,627 | B2 * | 8/2023 | Zien | A63F 13/73<br>463/29 |

| | | | |
|---|---|---|---|
| 2001/0007979 | A1 | 7/2001 | Teshima |
| 2001/0025253 | A1 | 9/2001 | Heintz |
| 2001/0032240 | A1 | 10/2001 | Malone |
| 2001/0049301 | A1 | 12/2001 | Masuda |
| 2001/0049651 | A1 | 12/2001 | Selleck |
| 2001/0056383 | A1 | 12/2001 | Shuster |
| 2002/0002514 | A1 | 1/2002 | Kamachi |
| 2002/0007319 | A1 | 1/2002 | Yu |
| 2002/0026388 | A1 | 2/2002 | Roebuck |
| 2002/0035480 | A1 | 3/2002 | Gordon |
| 2002/0035593 | A1 | 3/2002 | Salim |
| 2002/0043568 | A1 | 4/2002 | Hess |
| 2002/0065870 | A1 | 5/2002 | Baehr-Jones |
| 2002/0073043 | A1 | 6/2002 | Herman |
| 2002/0090995 | A1 | 7/2002 | Haga |
| 2002/0095387 | A1 | 7/2002 | Sosa |
| 2002/0095586 | A1 | 7/2002 | Doyle |
| 2002/0096831 | A1 | 7/2002 | Nakayama |
| 2002/0097856 | A1 | 7/2002 | Wullert |
| 2002/0105533 | A1 | 8/2002 | Cristo |
| 2002/0116466 | A1 | 8/2002 | Trevithick |
| 2002/0124137 | A1 | 9/2002 | Ulrich |
| 2002/0125312 | A1 | 9/2002 | Ogilvie |
| 2002/0130904 | A1 | 9/2002 | Becker |
| 2002/0135618 | A1 | 9/2002 | Maes |
| 2002/0169644 | A1 | 11/2002 | Greene |
| 2002/0169665 | A1 | 11/2002 | Hughes |
| 2002/0184373 | A1 | 12/2002 | Maes |
| 2002/0184391 | A1 | 12/2002 | Phillips |
| 2002/0188688 | A1 | 12/2002 | Bice |
| 2003/0004774 | A1 | 1/2003 | Greene |
| 2003/0008712 | A1 | 1/2003 | Poulin |
| 2003/0014297 | A1 | 1/2003 | Kaufman |
| 2003/0014423 | A1 | 1/2003 | Chuah |
| 2003/0032476 | A1 | 2/2003 | Walker |
| 2003/0050977 | A1 | 3/2003 | Puthenkulam |
| 2003/0055892 | A1 | 3/2003 | Huitema |
| 2003/0056002 | A1 | 3/2003 | Trethewey |
| 2003/0076353 | A1 | 4/2003 | Blackstock |
| 2003/0101343 | A1 | 5/2003 | Eaton |
| 2003/0112952 | A1 | 6/2003 | Brown |
| 2003/0135433 | A1 | 7/2003 | Yan |
| 2003/0135621 | A1 | 7/2003 | Romagnoli |
| 2003/0141977 | A1 | 7/2003 | Brown |
| 2003/0145128 | A1 | 7/2003 | Baird |
| 2003/0149675 | A1 | 8/2003 | Ansari |
| 2003/0158827 | A1 | 8/2003 | Ansari |
| 2003/0164827 | A1 | 9/2003 | Gottesman |
| 2003/0177187 | A1 | 9/2003 | Levine |
| 2003/0195957 | A1 | 10/2003 | Banginwar |
| 2003/0210265 | A1 | 11/2003 | Haimberg |
| 2004/0001616 | A1 | 1/2004 | Gutta |
| 2004/0014514 | A1 | 1/2004 | Yacenda |
| 2004/0030888 | A1 | 2/2004 | Roh |
| 2004/0053690 | A1 | 3/2004 | Fogel |
| 2004/0054667 | A1 | 3/2004 | Kake |
| 2004/0059781 | A1 | 3/2004 | Yoakum |
| 2004/0078432 | A1 | 4/2004 | Manber |
| 2004/0078596 | A1 | 4/2004 | Kent |
| 2004/0088303 | A1 | 5/2004 | Elder |
| 2004/0097287 | A1 | 5/2004 | Postrel |
| 2004/0103079 | A1 | 5/2004 | Tokusho |
| 2004/0107125 | A1 | 6/2004 | Guheen |
| 2004/0110552 | A1 | 6/2004 | Del Prado |
| 2004/0113756 | A1 | 6/2004 | Mollenkopf |
| 2004/0122553 | A1 | 6/2004 | Phan |
| 2004/0127277 | A1 | 7/2004 | Walker |
| 2004/0128181 | A1 | 7/2004 | Zurko |
| 2004/0143852 | A1 | 7/2004 | Meyers |
| 2004/0163133 | A1 | 8/2004 | Ueda |
| 2004/0166935 | A1 | 8/2004 | Gavin |
| 2004/0167880 | A1 | 8/2004 | Smith |
| 2004/0172339 | A1 | 9/2004 | Snelgrove |
| 2004/0174392 | A1 | 9/2004 | Bjoernsen |
| 2004/0186886 | A1 | 9/2004 | Galli et al. |
| 2004/0205134 | A1 | 10/2004 | Digate |
| 2004/0210627 | A1 | 10/2004 | Kroening |
| 2004/0225387 | A1 | 11/2004 | Jay |
| 2004/0228291 | A1 | 11/2004 | Huslak |
| 2004/0243664 | A1 | 12/2004 | Horstemeyer |
| 2004/0244006 | A1 | 12/2004 | Kaufman |
| 2004/0260771 | A1 | 12/2004 | Gusler et al. |
| 2004/0266505 | A1 | 12/2004 | Keam |
| 2004/0268386 | A1 | 12/2004 | Logan |
| 2005/0015571 | A1 | 1/2005 | Kaufman |
| 2005/0021472 | A1 | 1/2005 | Gettman |
| 2005/0021484 | A1 | 1/2005 | Bodin |
| 2005/0027696 | A1 | 2/2005 | Swaminathan |
| 2005/0043097 | A1 | 2/2005 | March |
| 2005/0050137 | A1 | 3/2005 | Bodin |
| 2005/0054381 | A1 | 3/2005 | Lee |
| 2005/0060368 | A1 | 3/2005 | Wang |
| 2005/0071306 | A1 | 3/2005 | Kruszewski |
| 2005/0071428 | A1 | 3/2005 | Khakoo |
| 2005/0071462 | A1 | 3/2005 | Bodin |
| 2005/0075934 | A1 | 4/2005 | Knight |

(56) References Cited

U.S. PATENT DOCUMENTS

2005/0080859 A1 4/2005 Lake
2005/0085296 A1 4/2005 Gelb
2005/0091380 A1 4/2005 Gonen
2005/0097440 A1 5/2005 Lusk
2005/0102188 A1 5/2005 Hutchison
2005/0113164 A1 5/2005 Buecheler
2005/0132009 A1 6/2005 Solie
2005/0137015 A1 6/2005 Rogers
2005/0138108 A1 6/2005 Galvin
2005/0143174 A1 6/2005 Goldman
2005/0149620 A1 7/2005 Kirkland
2005/0161878 A1 7/2005 Nally
2005/0165893 A1 7/2005 Feinberg
2005/0177428 A1 8/2005 Ganz
2005/0177453 A1 8/2005 Anton
2005/0182729 A1 8/2005 Kananen
2005/0192864 A1 9/2005 Ganz
2005/0216346 A1 9/2005 Kusumoto
2005/0216361 A1 9/2005 Fukada
2005/0223075 A1 10/2005 Swearingen et al.
2005/0240531 A1 10/2005 Wolff
2005/0246711 A1 11/2005 Berstis
2005/0251512 A1 11/2005 McCauley
2005/0253840 A1 11/2005 Kwon
2005/0277472 A1 12/2005 Gillan
2006/0003305 A1 1/2006 Kelmar
2006/0004659 A1 1/2006 Hutchison
2006/0026253 A1 2/2006 Kessen
2006/0028475 A1 2/2006 Tobias
2006/0031128 A1 2/2006 Lamitie
2006/0031322 A1 2/2006 Kessen
2006/0031326 A1 2/2006 Ovenden
2006/0036688 A1 2/2006 McMahan
2006/0121990 A1 6/2006 O'Kelley
2006/0128460 A1 6/2006 Muir
2006/0129643 A1 6/2006 Nielson
2006/0155813 A1 7/2006 Dietz et al.
2006/0160589 A1 7/2006 Okada
2006/0161788 A1 7/2006 Turpin
2006/0161852 A1 7/2006 Chen
2006/0178966 A1 8/2006 Jung
2006/0178968 A1 8/2006 Jung
2006/0178975 A1 8/2006 Jung
2006/0184260 A1 8/2006 Graepel
2006/0190591 A1 8/2006 Bobde
2006/0194632 A1 8/2006 Hendrickson
2006/0195462 A1 8/2006 Rogers
2006/0234795 A1 10/2006 Dhunjishaw
2006/0235790 A1* 10/2006 Jung ...................... G06N 3/006
705/39
2006/0252526 A1 11/2006 Walker
2006/0258462 A1 11/2006 Cheng
2006/0258463 A1 11/2006 Cugno
2007/0002057 A1 1/2007 Danzig
2007/0026934 A1 2/2007 Herbrich
2007/0026942 A1 2/2007 Kinsley
2007/0050716 A1 3/2007 Leahy
2007/0066400 A1 3/2007 Kogo
2007/0066403 A1 3/2007 Conkwright
2007/0073582 A1 3/2007 Jung
2007/0087799 A1 4/2007 Van Luchene
2007/0087815 A1* 4/2007 Van Luchene ......... G06Q 50/10
463/25
2007/0087822 A1 4/2007 Van
2007/0087831 A1* 4/2007 Van Luchene .......... A63F 13/85
463/42
2007/0106526 A1 5/2007 Jung
2007/0111770 A1 5/2007 Van
2007/0111789 A1 5/2007 van Deursen
2007/0112574 A1 5/2007 Greene
2007/0112624 A1 5/2007 Jung
2007/0112706 A1 5/2007 Herbrich
2007/0117615 A1* 5/2007 Van Luchene .......... A63F 13/35
463/25
2007/0117623 A1 5/2007 Nelson
2007/0117636 A1 5/2007 Takahashi
2007/0130001 A1 6/2007 Jung
2007/0155508 A1 7/2007 Sun
2007/0168444 A1 7/2007 Chen
2007/0168447 A1 7/2007 Chen
2007/0173323 A1 7/2007 Johnson
2007/0180040 A1 8/2007 Etgen
2007/0202951 A1 8/2007 Bogosian
2007/0214117 A1 9/2007 Shu
2007/0218987 A1 9/2007 Van
2007/0218997 A1 9/2007 Cho
2007/0223607 A1 9/2007 Lehne
2007/0226119 A1 9/2007 Balser
2007/0226176 A1 9/2007 Bestgen
2007/0233839 A1 10/2007 Gaos
2007/0247979 A1 10/2007 Brillon
2007/0255677 A1 11/2007 Alexander
2007/0260567 A1 11/2007 Funge
2007/0265718 A1 11/2007 Graepel
2007/0265969 A1 11/2007 Horwat
2007/0281285 A1 12/2007 Jayaweera
2007/0282695 A1 12/2007 Toper
2007/0288387 A1 12/2007 Park
2007/0298867 A1 12/2007 Huang
2008/0004094 A1 1/2008 Mueller
2008/0004116 A1 1/2008 Van
2008/0014917 A1 1/2008 Rhoads
2008/0019353 A1 1/2008 Foote
2008/0059304 A1 3/2008 Kimsey
2008/0059570 A1* 3/2008 Bill .......................... G06F 40/58
709/203
2008/0064467 A1 3/2008 Reiner
2008/0086382 A1 4/2008 Ur
2008/0097891 A1 4/2008 Park
2008/0113815 A1 5/2008 Weingardt
2008/0120558 A1 5/2008 Nathan
2008/0126350 A1 5/2008 Shoemaker
2008/0133392 A1 6/2008 Jung
2008/0155019 A1 6/2008 Wallace
2008/0159634 A1 7/2008 Sharma
2008/0162317 A1 7/2008 Banaugh
2008/0176655 A1 7/2008 James
2008/0207327 A1 8/2008 Van
2008/0207329 A1 8/2008 Wallace
2008/0208749 A1 8/2008 Wallace
2008/0209527 A1 8/2008 Dudley
2008/0214287 A1 9/2008 Lutnick
2008/0215540 A1 9/2008 Bestgen
2008/0215975 A1 9/2008 Harrison
2008/0220876 A1 9/2008 Mehta
2008/0222104 A1 9/2008 Stewart
2008/0228607 A1 9/2008 Jung
2008/0235111 A1 9/2008 Dotan
2008/0242420 A1 10/2008 Graepel
2008/0252716 A1 10/2008 Kano
2008/0254893 A1 10/2008 Patel
2008/0263460 A1 10/2008 Altberg
2008/0268943 A1 10/2008 Jacob
2008/0270605 A1 10/2008 Berstis
2008/0270916 A1 10/2008 Chen
2008/0275789 A1 11/2008 Ganz
2008/0281622 A1 11/2008 Hoal
2008/0282090 A1 11/2008 Leybovich
2008/0288343 A1 11/2008 Ho
2008/0297515 A1 12/2008 Bliss
2008/0301405 A1 12/2008 Kaufman
2009/0005172 A1 1/2009 Shibahara
2009/0030774 A1 1/2009 Rothschild
2009/0063283 A1 3/2009 Kusumoto
2009/0075738 A1 3/2009 Pearce
2009/0083192 A1 3/2009 Bokor
2009/0088233 A1 4/2009 O'Rourke
2009/0089157 A1 4/2009 Narayanan
2009/0094225 A1 4/2009 Cradick
2009/0099925 A1 4/2009 Mehta
2009/0100352 A1 4/2009 Huang
2009/0113448 A1 4/2009 Smith
2009/0118006 A1 5/2009 Kelly
2009/0137320 A1 5/2009 Kimura

(56) References Cited

U.S. PATENT DOCUMENTS

2009/0144633 A1 6/2009 Schultz
2009/0157495 A1 6/2009 Cahuzac
2009/0157625 A1 6/2009 Jung
2009/0209335 A1 8/2009 Pearce
2009/0210333 A1* 8/2009 Titus ..................... G06Q 30/02 705/35
2009/0210885 A1 8/2009 Bantz
2009/0216546 A1 8/2009 Huang
2009/0228550 A1 9/2009 Kawachiya
2009/0234948 A1 9/2009 Garbow
2009/0235191 A1 9/2009 Garbow
2009/0248544 A1 10/2009 Ganz
2009/0253494 A1 10/2009 Fitch
2009/0254417 A1 10/2009 Beilby
2009/0280909 A1 11/2009 Mceniry
2009/0287765 A1 11/2009 Hamilton
2009/0299960 A1 12/2009 Lineberger
2009/0307021 A1 12/2009 Hamilton
2009/0325711 A1 12/2009 Bronstein
2010/0030578 A1 2/2010 Siddique
2010/0131864 A1 5/2010 Bokor
2010/0169798 A1 7/2010 Hyndman
2010/0169800 A1 7/2010 Lance
2010/0173701 A1 7/2010 Van Luchene
2010/0173713 A1 7/2010 Van Luchene
2010/0203963 A1 8/2010 Allen
2010/0205179 A1 8/2010 Carson
2010/0210349 A1 8/2010 Blair
2010/0267450 A1 10/2010 Mcmain
2010/0280919 A1 11/2010 Everett
2010/0293569 A1 11/2010 Kusumoto
2010/0304839 A1 12/2010 Johnson
2010/0306672 A1 12/2010 Mceniry
2011/0010270 A1 1/2011 Hamilton
2011/0092279 A1 4/2011 Pilip
2011/0107433 A1 5/2011 Steelberg
2011/0126272 A1 5/2011 Betzler
2011/0131085 A1 6/2011 Wey
2011/0190063 A1 8/2011 Kajii
2011/0208615 A1 8/2011 Steelberg
2011/0212762 A1 9/2011 Ocko
2011/0261071 A1 10/2011 Ganetakos
2011/0281638 A1 11/2011 Bansi
2012/0009997 A1 1/2012 Youm
2012/0010734 A1 1/2012 Youm
2012/0015736 A1 1/2012 Vanbragt
2012/0021823 A1 1/2012 Youm
2012/0021825 A1 1/2012 Harp
2012/0064968 A1 3/2012 Youm
2012/0094751 A1 4/2012 Reynolds
2012/0122552 A1 5/2012 Youm
2012/0142429 A1 6/2012 Muller
2012/0190456 A1 7/2012 Rogers
2012/0244950 A1 9/2012 Braun
2012/0289346 A1* 11/2012 Van Luchene .......... A63F 13/61 463/42
2012/0315993 A1 12/2012 Dumont
2012/0316999 A1 12/2012 Koh
2013/0036373 A1* 2/2013 Alderfer ............ G06Q 30/0229 715/757
2013/0111367 A1 5/2013 Park
2013/0143670 A1* 6/2013 Junkin .................... A63F 13/65 463/42
2013/0225260 A1 8/2013 Cudak
2013/0252737 A1 9/2013 Mescon
2013/0260876 A1 10/2013 Margalith
2013/0266927 A1 10/2013 Mann
2013/0274001 A1* 10/2013 de Jesus ................. A63F 13/87 463/25
2013/0296046 A1 11/2013 Mianji
2014/0004955 A1 1/2014 Nahari
2014/0004960 A1 1/2014 Soti
2014/0011595 A1 1/2014 Muller
2014/0024445 A1 1/2014 Aller
2014/0114845 A1* 4/2014 Rogers .................. G06T 19/006 345/419
2014/0162763 A1 6/2014 Kim
2014/0162781 A1 6/2014 Butler
2014/0235356 A1 8/2014 Yamane
2014/0274402 A1 9/2014 Michel
2014/0342808 A1 11/2014 Chowdhary
2014/0344725 A1 11/2014 Bates
2014/0349753 A1 11/2014 Lmai
2015/0024852 A1 1/2015 Pacey
2015/0031426 A1 1/2015 Alloway
2015/0038233 A1 2/2015 Rom
2015/0051000 A1 2/2015 Henn
2015/0220836 A1 8/2015 Wilson
2015/0310698 A1 10/2015 Polis
2016/0001181 A1 1/2016 Marr
2016/0001182 A1 1/2016 Marr
2016/0001186 A1 1/2016 Marr
2016/0005270 A1 1/2016 Marr
2016/0067611 A1 3/2016 Ware
2016/0067612 A1 3/2016 Ntoulas
2016/0166935 A1 6/2016 Condrey
2016/0180598 A1* 6/2016 Rogers ................. G06Q 20/145 345/633
2016/0191671 A1 6/2016 Dawson
2016/0210602 A1* 7/2016 Siddique ................ G16H 10/60
2016/0296840 A1 10/2016 Kaewell
2016/0358239 A1 12/2016 Inagaki
2017/0052676 A1 2/2017 Pulier
2017/0178236 A1 6/2017 Saigh
2017/0186232 A1* 6/2017 Dange ..................... G06F 3/011
2017/0206797 A1 7/2017 Solomon
2017/0259178 A1 9/2017 Aghdaie
2017/0264681 A1 9/2017 Apte
2017/0279719 A1 9/2017 Faith
2017/0294209 A1* 10/2017 Newell .............. H04N 21/8106
2018/0104586 A1 4/2018 Kim
2018/0104595 A1 4/2018 Kawachiya
2018/0114403 A1 4/2018 Jayachandran
2018/0169515 A1 6/2018 Rice
2018/0280806 A1 10/2018 Otomo
2018/0308473 A1 10/2018 Scholar
2019/0043239 A1 2/2019 Goel
2019/0081848 A1 3/2019 Zou
2019/0107935 A1* 4/2019 Spivack ............. G06Q 30/0277
2019/0126150 A1 5/2019 Tartaj
2019/0163871 A1* 5/2019 Curbera ................. G16H 10/60
2019/0205727 A1 7/2019 Lin
2019/0295306 A1 9/2019 Weston
2019/0340419 A1 11/2019 Milman
2019/0358547 A1* 11/2019 Mack ................. H04N 21/2187
2020/0122040 A1 4/2020 Juliani, Jr.
2020/0145615 A1 5/2020 Seko
2020/0289943 A1* 9/2020 Rico ..................... G06F 18/214
2020/0311245 A1 10/2020 Pollard
2020/0372400 A1 11/2020 Carreira-Perpiñán
2020/0401576 A1 12/2020 Yerli
2020/0402147 A1* 12/2020 Lin ....................... G06F 3/0482
2021/0019717 A1* 1/2021 Flinter ...................... H04L 9/50
2021/0082044 A1* 3/2021 Sliwka .................. H04L 9/3255
2021/0138349 A1* 5/2021 Zien ........................ A63F 13/69
2021/0182500 A1* 6/2021 Bill ......................... G06F 40/30
2022/0230240 A1* 7/2022 Sliwka ................... G06Q 40/02
2023/0372823 A1* 11/2023 Zien ........................ A63F 13/75

FOREIGN PATENT DOCUMENTS

CA 2143874 6/2000
CA 2292678 7/2005
CA 2552135 7/2013
CN 1334650 A 2/2002
CN 1202652 C 10/2002
CN 1141641 C 3/2004
CN 1494679 A 5/2004
CN 1219384 9/2005
CN 1858757 A 11/2006
CN 1307544 3/2007
CN 100407675 7/2008
CN 100423016 C 10/2008

(56) References Cited

FOREIGN PATENT DOCUMENTS

| | | | |
|---|---|---|---|
| CN | 100557637 | | 11/2009 |
| CN | 101001678 | B | 5/2010 |
| CN | 101436242 | | 12/2010 |
| CN | 101801482 | B | 12/2014 |
| EP | 668583 | | 8/1995 |
| EP | 0969430 | A1 | 1/2000 |
| EP | 0627728 | B1 | 9/2000 |
| EP | 0717337 | B1 | 8/2001 |
| EP | 1207694 | A2 | 5/2002 |
| EP | 1209849 | A2 | 5/2002 |
| EP | 0679977 | B1 | 10/2002 |
| EP | 0679978 | B1 | 3/2003 |
| EP | 0890924 | B1 | 9/2003 |
| EP | 1377902 | B1 | 8/2004 |
| EP | 0813132 | B1 | 1/2005 |
| EP | 1380133 | B1 | 3/2005 |
| EP | 1021021 | B1 | 9/2005 |
| EP | 0930584 | B1 | 10/2005 |
| EP | 0883087 | B1 | 8/2007 |
| EP | 1176828 | B1 | 10/2007 |
| EP | 2076888 | B1 | 7/2015 |
| GB | 2339938 | | 10/2002 |
| GB | 2352154 | | 7/2003 |
| JP | H11191097 | A | 4/1999 |
| JP | 11191097 | | 7/1999 |
| JP | 3033956 | B2 | 4/2000 |
| JP | 3124916 | B2 | 1/2001 |
| JP | 2001119403 | A | 4/2001 |
| JP | 3177221 | B2 | 6/2001 |
| JP | 2001204973 | A | 7/2001 |
| JP | 3199231 | B2 | 8/2001 |
| JP | 2001230883 | A | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 2004062539 | A | 2/2004 |
| JP | 3575598 | | 7/2004 |
| JP | 3579823 | B | 7/2004 |
| JP | 3579154 | B2 | 10/2004 |
| JP | 2005050081 | A | 2/2005 |
| JP | 2005234633 | A | 9/2005 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5550720 | B2 | 7/2014 |
| JP | 2015002839 | A | 1/2015 |
| JP | 5734566 | B2 | 6/2015 |
| KR | 20020038229 | A | 5/2002 |
| KR | 20030039019 | A | 5/2003 |
| MY | 117864 | A | 8/2004 |
| SG | 55396 | | 12/1998 |
| TW | 424213 | | 3/2001 |
| TW | 527825 | | 4/2003 |
| WO | 0060444 | A1 | 10/2000 |
| WO | 0062231 | A1 | 10/2000 |
| WO | 0137162 | A2 | 5/2001 |
| WO | 0201455 | A2 | 1/2002 |
| WO | 0203645 | A2 | 1/2002 |
| WO | 2002073457 | | 9/2002 |
| WO | 20020087156 | | 10/2002 |
| WO | 03044755 | A1 | 5/2003 |
| WO | 03049459 | A1 | 6/2003 |
| WO | 03058518 | A2 | 7/2003 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

OTHER PUBLICATIONS

"Universally Unique Identifier", 2006 (http://en.wikipedia.org/wiki/UUID).

Peter Jorissen et al., "Dynamic Interactions in Physically Realistic Collaborative Virtual Environments," 2005, IEEE Transactions on Visualization and Computer Graphics, vol. 11, No. 6, published by IEEE Computer Society, pp. 649-660.

E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.

Roaming Virtual World Is a Real Trip; [Final Edition] Leslie Walker. The Washington Post. Washington, D.C.: Mar. 30, 2006.

Lee et al., "A Self-Adjusting Data Distribution Mechanism for Multidimensional Load Balancing in Multiprocessor-Based Database Systems," Information Systems vol. 19, No. 7, pp. 549-567, 1994.

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.

"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.

IBM, Transcoding: Extending e-business to new environments, Britton et al., Sep. 22, 2000.

IBM developer Works, OptimalGrid—autonomic computing on the Grid, James H. Kaufman; Tobin J. Lehman; Glenn Deen; and John Thomas, Jun. 2003.

International Search Report as Published as WO2005/079538 in corresponding international application No. PCT/US2005/005550. Jul. 5, 2006.

Feldman, R. "Mining unstructured data". Tutorial notes for ACK SIGKDD 1999. ACM Press. 182-236.

Wang, Y. "Web Mining and Knowledge Discovery of Usage Patterns". CS748T Project (Part I) Feb. 2000.

Sack, W. "Conversation Map: a content-based Usenet newsgroup browser". Proceedings of the 2000 International Conference on Intelligent User Interfaces. ACM Press. 233-240.

Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.

Garton, L., C. Haythornthwaite, B. Wellman. "Studying on-line social networks in Doing Internet Research", Jun. 1997.

Ackerman, M.S., B. Starr. "Social activity indicators: interface components for CSCW systems". Proceedings of the 8th ACM Symposium on User Interface and Software Technology. ACM Press. 159-168, Nov. 14-17, 1995.

Qureshi, S. "Supporting electronic group processes: a social perspective". Proceedings of the 1995 ACM SIGCPR Conference on Supporting teams, groups, and learning inside the IS function. ACM Press. 24-34.

Wellman, B. "For a social network analysis of computer networks: a sociological perspective on collaborative work and virtual community". Proceedings of the 1996 conference on ACM SIGCPR/SIGMIS. 1-11.

(56) References Cited

OTHER PUBLICATIONS

Schwartz, M. F., D. C. M. Wood. "Discovering shared interests among people using graph analysis of global electronic mail traffic". Department of Computer Science, University of Colorado, Boulder CO. Oct. 1992.
Kautz, H., B. Selman, M. Shah.. "Referral Web: Combining Social Networks and Collaborative Filtering". Communications of the ACM, vol. 40, No. 3, Mar. 1997.
"Fascinating Facts about the Invention of Cabbage Patch kids by Xavier Roberts in 1983," http://www.ideafinder.com/history/inventions/cabbagepatch.htm, Oct. 25, 2006.
"CMAX Promotional Footwear," http://web.archive.org/web/20040405163227/http://promo.customatix.com/, Apr. 5, 2004.
Plouznikoff, Alexandre, et al., Enhancing Human-Machine Interactions: Virtual Interface Alteration Through Wearable Computers, CHI 2006 Proceedings, Interaction Methods, Apr. 22-27, 2006, Montreal, Quebec, Canada.
V. Stojanovic, "Virtual boutique-try clothes on-line", 5th International Conference on Telecommunications in Modern Satellite, Cable and Broadcasting Service. Telsiks 2001. Proceedings of Papers (Cat. No. 01EX517), 2001, pt. 2, p. 802-3 vol. 2.
Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.
Jancke, Gavin, et al., Linking Public Spaces: Technical and Social Issues, CHI 2001, Mar. 31-Apr. 5, 2006, vol. No. 4, issue No. 1.
Hassen et al., "A Task-and Data-Parallel Programming Language Based on Shared Objects," ACM Transactions on Programming Languages and Systems, vol. 20, No. 6, Nov. 1998, pp. 1131-1170.
Ma et al., "A Scalable Parallel Cell-Projection Volume Rendering Algorithm for Three-Dimensional Unstructured Data", IEEE 1997, pp. 1-10.
Andert, "A Simulation of Dynamic Task Allocation in a Distributed Computer System," Proceedings of the 1987 Winter Simulation Conference, 1987, pp. 1-9.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
"World of Warcraft." Wikipedia. Accessed Aug. 23, 2022. <https://en.wikipedia.org/wiki/World_of_Warcraft> (Year: 2022).

* cited by examiner

200

| Virtual Item (ID) (202) | Attribute (204) | Owner (ID) (206) | Trigger (208) | Player with Conditional Access (ID) (210) | Time Duration (212) |
|---|---|---|---|---|---|
| | | | | | |
| | | | | | |
| | | | | | |
| | | | | | |
| | | | | | |

FIG. 2

302 — Creating a Database of Virtual Items, Owned by At Least One First Player, that are Conditionally Accessible to At Least One Second Player is Generated. The Conditional Accessibility is Determined Based on At Least One Predefined Condition

304 — An Attribute of an In-game Virtual Item Owned by a First Player is Modified in Order to Notify Other Players of a Video Game that the Item May be Made Conditionally Available to One or More of the Players for a Predefined Period of Time Upon Fulfillment of One or More Conditions

306 — One or More Second Players Fulfill the One or More Access Conditions in Order to Obtain the Item for the Period of Time

308 — The Item is made Conditionally Accessible to the One or More Second Players who have Fulfilled the Access Condition(s) for the Period of Time

310 — Data Structures Associated with the First Player and the One or More Second Players are Modified to Reflect the Conditional Access of the Item for the Predefined Period of Time

312 — Has the Time Period Elapsed?

313 (Yes) — The Accessibility of the Item is Withdrawn from the One or More Players

316 (No) — Proceed with Game

314 — Data Structures Associated with the First Player and the One or More Players are Modified to Reflect the Termination of Conditional Accessibility

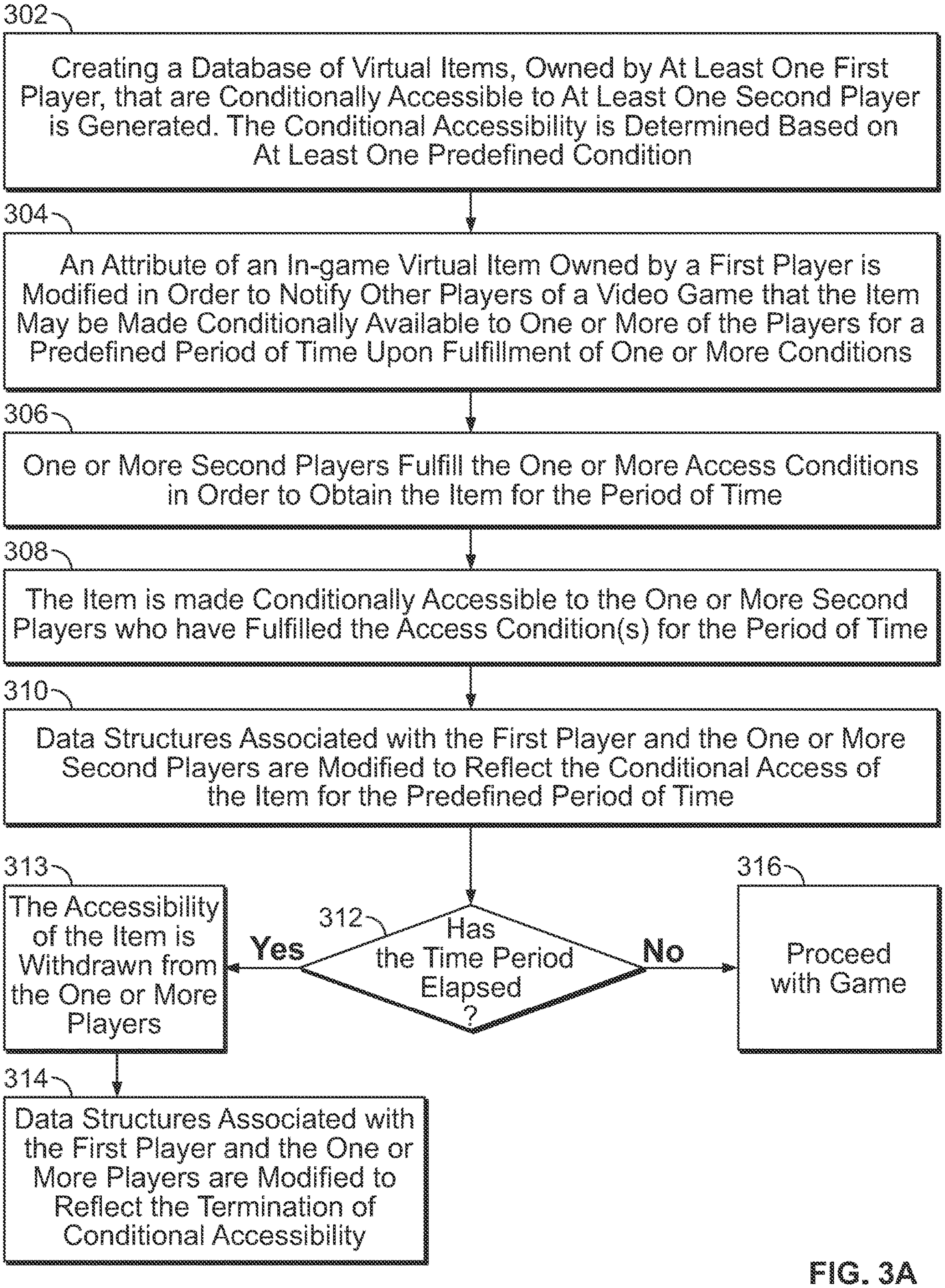

| Virtual Item (ID) | Attribute | | |
|---|---|---|---|
| | Availably Time | Color Change | Descriptor Change |
| | | | |
| | | | |
| | | | |
| | | | |

FIG. 4C

SYSTEM AND METHOD FOR PROVIDING CONDITIONAL ACCESS TO VIRTUAL GAMING ITEMS

CROSS-REFERENCE

The present application is a continuation application of U.S. patent application Ser. No. 17/086,594, titled "System and Method for Providing Conditional Access to Virtual Gaming Items" and filed on Nov. 2, 2020, which relies on, for priority, U.S. Patent Provisional Application No. 62/933,209, of the same title and filed on Nov. 8, 2019, both of which are incorporated by reference herein in their entirety.

FIELD

The present specification is related generally to the field of gaming, animation and computer graphics. More specifically, the present specification discloses systems and methods for providing conditional accessibility of in-game virtual items to players.

BACKGROUND

The proliferation of reliable and affordable broadband services allows for a greater number of people to enjoy computer or video games of various genres. For example, in some computer games, players conquer territories or complete other missions for ever-increasing rewards. In many role-playing games (RPG) or first-person shooter (FPS) games, each player controls the actions of at least one character. In addition, players develop unique characters and by controlling the actions of the characters they create during gameplay, the players (via their characters) accumulate various in-game objects and abilities through extended play. The rules for how quickly, how many and what type of in-game abilities and objects a character may earn or gain usually involves several ratings or statistics. These ratings determine the outcome of various chance or future events that lead to new in-game objects and abilities.

In most of the currently available video games, players have the option to either acquire or earn through gameplay, in-game items (such as objects or abilities) permanently tied to their gaming account. Examples of these items include, but are not limited to, weapon skins, character outfits, and character dances. In various games, a player's success in gameplay is determined by the number of in-game objects and abilities gathered by the player. In some other games, a player may be required to obtain one or more predefined in-game objects and abilities to be able to progress further in the game. Some of these in-game items may be difficult to obtain either due to their limited availability or because the process of obtaining said items requires a high level of skill in game-play. The rarity of said in-game items may vary and may be classified accordingly. In some formats, the in-game items may be classified as "common", "rare", "epic", or "legendary", in order of increasing rarity.

In some cases, a player of a video game may be in possession of one or more in-game items, but may not be using said items during game-play. Some of these items may be 'rare' and difficult to obtain and may be sought after by other players of said game. Access to these in-game items lying unused in a first player's gaming inventory may improve the gameplay experience for a second player who does not possess said items.

Hence, there is need for a method through which unused gaming inventory items of one player may be made conditionally or selectively accessible, upon fulfillment of one or more predefined conditions, to a second player for improving the gameplay experience of the second player. There is also a need for managed data structures that can effectively track and associate inventory items with specific players and to provide selective, controlled, and/or conditional access to the same inventory items to other players who may not have attain those inventory items through standard gameplay.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification is directed towards a method for providing conditional access to a virtual gaming item that is allocated to a first player of a video game, wherein the video game provides conditional access to the virtual gaming item to a second player, the method comprising: generating a data set of conditionally accessible virtual video game items in a form of an electronically stored data structure, wherein the conditionally accessible virtual video game items include the virtual gaming item; using the data structure, logically associating at least one predefined condition with each of the virtual video game items; generating a plurality of graphical user interfaces in the video game, wherein at least one of the plurality of graphical user interfaces is configured to prompt for, and receive, data representative of one or more attributes of each of the conditionally accessible virtual video game items and wherein the one or more attributes are at least indicative of one or more predefined periods of time for which each of the conditionally accessible virtual video game items is conditionally accessible; monitoring data generated by an execution of the video game to determine if the at least one predefined condition for the virtual gaming item is met by the second player; based on data generated by the execution of the video game and representative of the at least one predefined condition being met by the second player, at least temporarily providing access to the virtual gaming item to the second player within the video game and at least temporarily denying access to virtual gaming item to the first player within the video game; and after the one or more predefined periods of time elapses, providing access to the virtual gaming item to the first player within the video game and denying access to the second player within the video game.

Optionally, the method further comprises notifying the first player that the virtual item is being made accessible to the second player for the one or more predefined periods of time.

Optionally, the method further comprises modifying at least one data structure associated with each of the first player, the second player, and the virtual gaming item to record said conditional accessibility to the virtual gaming item and a first time.

Optionally, the method further comprises determining if the one or more predefined periods of time has elapsed by acquiring a current time, determining a difference between the current time and the first time, and terminating conditional accessibility to the virtual gaming item for the second player if the difference is equal to or greater than the one or more predefined periods of time.

Optionally, the method further comprises modifying the at least one data structure associated with each of the first player, the second player, and the virtual gaming item to record the termination of the conditional accessibility to the virtual gaming item.

Optionally, the method further comprises generating a graphical user interface to notify at least the second player that the virtual gaming item is conditionally available upon fulfillment of the at least one predefined condition.

Optionally, the one or more attributes further comprises at least one of a color of the conditionally accessible virtual video game items or a descriptor of the conditionally accessible virtual video game items.

Optionally, the at least one predefined condition comprises a transfer of a predefined amount of virtual value to the first player by the second player.

Optionally, the at least one predefined condition comprises reaching a predefined gaming level by the second player.

Optionally, the method further comprises determining if a predefined percentage of a total number of the conditionally accessible virtual video game items has been obtained by a total player population playing the video game before enabling the virtual gaming item to be conditionally accessible.

In some embodiments, the present specification is directed toward a computer readable non-transitory medium comprising a plurality of executable programmatic instructions wherein, when said plurality of executable programmatic instructions are executed by a processor, conditional access to a virtual gaming item that is allocated to a first player of a video game is provided to a second player in a multi-player video gaming network, said multi-player video gaming network comprising at least one game server in data communication with client devices of the first player and the second player and wherein, when said plurality of executable programmatic instructions are executed by a processor, the video game: generates a data set of conditionally accessible virtual video game items in a form of an electronically stored data structure, wherein the conditionally accessible virtual video game items include the virtual gaming item; logically associates at least one predefined condition with each of the virtual video game items in the data structure; generates a plurality of graphical user interfaces, wherein at least one of the plurality of graphical user interfaces is configured to prompt for, and receive, data representative of one or more attributes of each of the conditionally accessible virtual video game items and wherein the one or more attributes are at least indicative of one or more predefined periods of time for which each of the conditionally accessible virtual video game items is conditionally accessible; monitors data generated by an execution of the video game to determine if the at least one predefined condition for the virtual gaming item is met by the second player; based on data generated by the execution of the video game and representative of the at least one predefined condition being met by the second player, at least temporarily provide access to the virtual gaming item to the second player within the video game and at least temporarily deny access to virtual gaming item to the first player within the video game; and after the one or more predefined periods of time elapses, provide access to the virtual gaming item to the first player within the video game and deny access to the second player within the video game.

Optionally, when said plurality of executable programmatic instructions are executed by a processor, the video game further notifies the first player that the virtual item is being made accessible to the second player for the one or more predefined periods of time.

Optionally, when said plurality of executable programmatic instructions are executed by a processor, the video game further modifies at least one data structure associated with each of the first player, the second player, and the virtual gaming item to record said conditional accessibility to the virtual gaming item and a first time.

Optionally, when said plurality of executable programmatic instructions are executed by a processor, the video game further determines if the one or more predefined periods of time has elapsed by acquiring a current time, determining a difference between the current time and the first time, and terminating conditional accessibility to the virtual gaming item for the second player if the difference is equal to or greater than the one or more predefined periods of time.

Optionally, when said plurality of executable programmatic instructions are executed by a processor, the video game further modifies the at least one data structure associated with each of the first player, the second player, and the virtual gaming item to record the termination of the conditional accessibility to the virtual gaming item.

Optionally, when said plurality of executable programmatic instructions are executed by a processor, the video game further generates a graphical user interface to notify at least the second player that the virtual gaming item is conditionally available upon fulfillment of the at least one predefined condition.

Optionally, the one or more attributes further comprises at least one of a color of the conditionally accessible virtual video game items or a descriptor of the conditionally accessible virtual video game items.

Optionally, the at least one predefined condition comprises a transfer of a predefined amount of virtual value to the first player by the second player.

Optionally, the at least one predefined condition comprises reaching a predefined gaming level by the second player.

Optionally, when said plurality of executable programmatic instructions are executed by a processor, the video game further determines if a predefined percentage of a total number of the conditionally accessible virtual video game items has been obtained by a total player population playing the video game before enabling the virtual gaming item to be conditionally accessible.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings:

FIG. 2 illustrates an exemplary data structure for managing and tracking ownership and conditional access of in-game virtual items, in accordance with an embodiment of the present specification;

FIG. 3A is a flowchart illustrating steps for providing conditional access to in-game virtual items to players of a video game, in accordance with an embodiment of the present specification;

FIG. 4C illustrates an exemplary tabular data structure for recording attributes of in-game virtual items, in accordance with an embodiment of the present specification;

DETAILED DESCRIPTION

Figure 1:
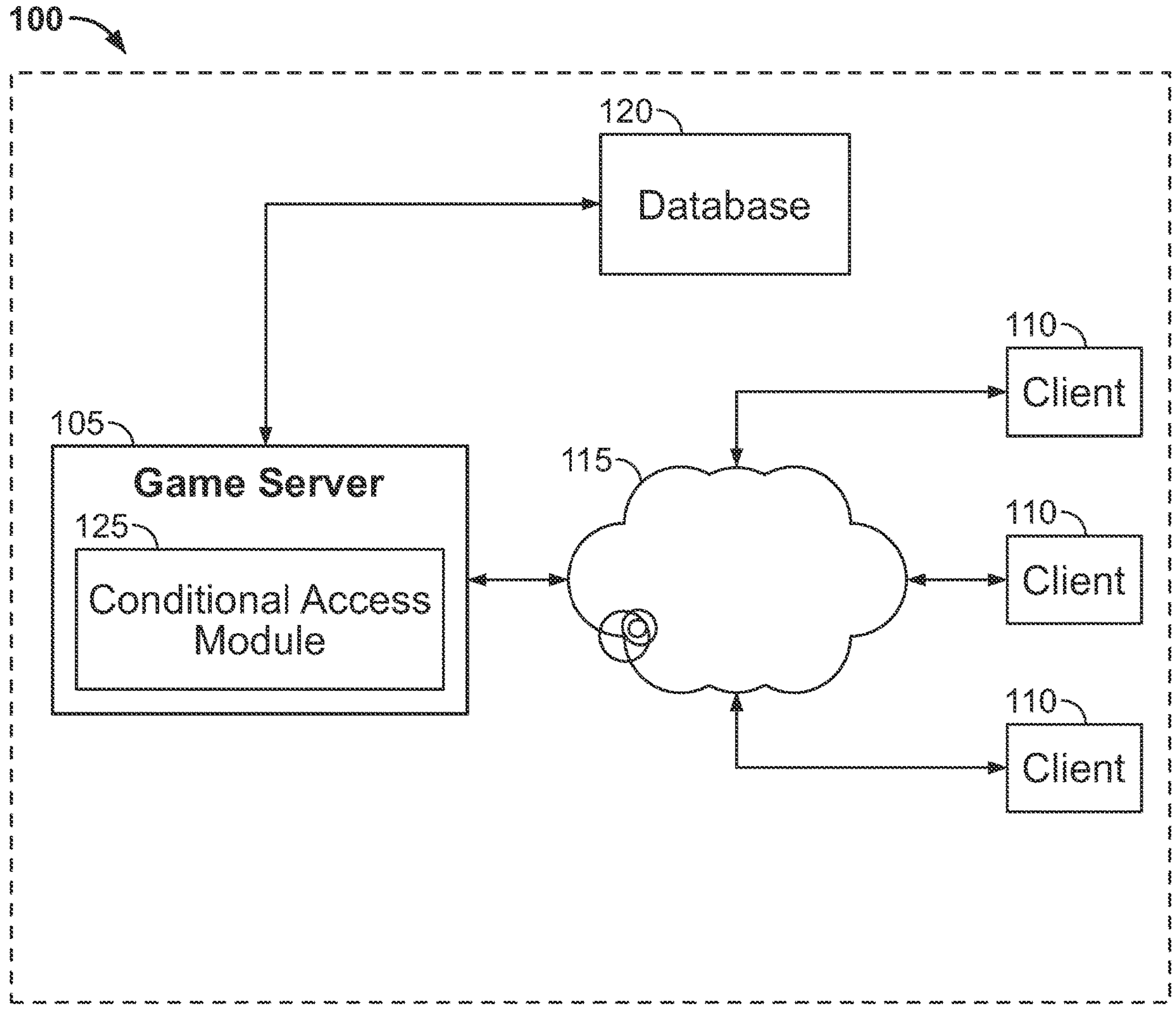
FIG. 1 illustrates an architecture of a gaming system in which methods of providing players with conditional access to virtual items may be implemented, in accordance with an embodiment of the present specification.

In various embodiments the present specification provides players of a video game conditional access to a set of predefined in-game virtual items that may enhance the player's gameplay experience. In an embodiment, a first player possessing a virtual item may make said item conditionally accessible to a second player, wherein the conditional accessibility is determined based on at least one predefined condition.

While aspects of the present specification may be described herein with reference to particular types of video game genres, the system and method described in detail herein may be used in any genre of single or multiplayer video games.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game database system, and executed by a processor.

As used herein, the indefinite articles "a" and "an" mean "at least one" or "one or more" unless the context clearly dictates otherwise.

The term "plurality of programmatically separate video games" means more than one video game where each of the video games comprises one or more separate executable files and can be fully played and engaged with independent of any other video game. The disclosed inventions are directed to an improvement in computer-related technology, namely providing players with conditional access to virtual items. In particular, the present specification discloses specific teachings regarding how players may be provided with conditional access to virtual items among other teachings. Accordingly, Applicant's claimed inventions do not preempt all approaches to managing the relations between parties and, instead, are directed to an improvement in video gaming technology grounded firmly in a specific way of achieving the desired outcome of allowing conditional access to the players of a video game of an in-game virtual item.

To the extent the claimed inventions are still considered to be "abstract" in nature, it should be appreciated that each of the claim limitations, when viewed as an ordered combination, amount to significantly more than just an abstract idea or concept. The methods and systems of the present invention represent technical improvements to a form of computer technology, video games, by providing a specialized computer system configured to host a plurality of concurrently executing video game streaming applications (for example, anywhere from at least 10 video game streaming applications to at least 100,000,000 video game streaming applications or any increment therein), host a plurality of client devices associated with remotely located players (for example, anywhere from at least 10 client devices associated with players to at least 100,000,000 client devices associated with players, or any increment therein), and perform a series of programmatic steps designed to generate electronic user interfaces that present a plurality of scenarios for providing players with conditional access to virtual items.

The presently disclosed embodiments are directed to methods for providing conditional access to a virtual gaming item that is allocated to a first player of a video game, wherein the video game represents one of a plurality of different instances of video game applications which are concurrently hosted by at least one server and wherein the plurality of different instances are greater than 10, as disclosed above.

FIG. 1 illustrates a gaming system 100 in which a method of making virtual items conditionally available to players may be implemented, in accordance with an embodiment of the present specification. The system 100 comprises a client-server architecture, where one or more game servers 105 are in communication with one or more remotely located client devices 110 over a network 115. Users may access the system 100 via the client devices 110 that may include, but not be limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115. The game server 105 is responsible for hosting, running, or executing a video game, and the remotely located client devices 110 are configured to execute an instance of the video game.

The video game may be from any video game genre. Video game genres include 1) action games, such as platform, shooter, fighting, stealth, survival, and rhythm games, 2) action-adventure games, such as survival horror or metroidvania games, 3) adventure games, such as text, graphic, visual, interactive or real-time 3D adventures, 4) role-playing games, such as action RPG, MMORPG, Roguelikes, tactical RPG, sandbox RPG, first-person party-based RPG, cultural differences, choices, or fantasy games, 5) simulation games, construction and management simulation, life simulation, or vehicle simulation games, 6) strategy games, such as 4X, artillery, real-time strategy, real-time tactics, multiplayer online battle arena, tower defense, turn based strategy, turn based tactics, wargame, or grand strategy games, 7) sports games, such as racing, competitive, basketball, football, baseball, soccer, hockey, or sports-based fighting, or 8) the following other genres: MMO, casual, party, programming, logic, trivia, board, card, advergame, art, or educational.

The one or more game servers 105 can be any computing device having one or more processors and one or more computer-readable storage media such as RAM, hard disk or any other optical or magnetic media. The one or more game servers 105 include a plurality of hardware, software, and/or firmware components operating together to provide or implement a plurality of functional, operational or service-oriented modules. In some embodiments, the one or more game servers 105 include or are in communication with a game database 120. In one embodiment, each game server is associated with a separate game database system. In another embodiment, a common database may serve two or more game servers. The game database 120 stores a plurality of game data associated with one or more games that are served or provided to the client devices 110 over the network 115. In one embodiment, the game database system 120 a plurality of databases, each storing a different kind of data. In some embodiments, the one or more game servers 105 may be implemented by a cloud of computing platforms operating together as game servers. In embodiments, a game server is another home console, a personal computing device, such as a laptop or tablet PC, or a dedicated server.

In an embodiment, the game server 105 comprises a conditional access module 125 which is coupled to and in communication with the database 120. The conditional access module 125 is configured 1) to cause a set of predefined virtual in-game items associated with a first set of one or more players to be conditionally available to, and therefore shareable with, a second set of one or more players based upon the fulfillment of one or more predefined conditions or "triggers", 2) if a virtual in-game item is made conditionally accessible, to broadcast or generally notify the second set of one or more players of the potential availability of the virtual in-game item, 3) to receive, track and enforce rules for actually conditionally sharing a specific in-game item with at least one of the second set of one or more players, 4) based upon actions taken by the at least one of the second set of one or more players, conditionally sharing the virtual in-game item with that player and modifying the associated data structures accordingly, and 5) after the conditions associated with access of the virtual in-game item terminates, causing the virtual in-game item to no longer be accessible to that player and modifying the associated data structures accordingly.

In some embodiments, predefined conditions may need to be fulfilled before an item may be made available for conditional access. In some embodiments, the predefined conditions for conditional access are determined by the system on a per game basis and stored in a data structure. In embodiments, conditional accessibility to a virtual item may not be enabled until a certain percentage of the item has been obtained by the total player population playing the video game. For example, an owner of a first item may not be allowed to make the item available for conditional access until a predefined percentage of the item has been spawned by the game and collected by the player population. In other examples, conditional accessibility of a virtual item to a second player may not be enabled unless the item has a predefined rarity level. In other embodiments, accessibility to a virtual item may only be enabled during promotional periods, such as a holiday. In some embodiments, the predetermined conditions for conditional access may include player attributes. For example, conditional access to a virtual item may not be enabled unless: a) a second player has attained a particular experience level; b) a second player has a predefined number of points/treasure; or c) a second player has or does not have a related item. In some embodiments, the predefined conditions for access are determined by the owner of the item. In an embodiment the owner is enabled to define the conditions that must be fulfilled by players seeking access to the item. Such conditions may be, but are not limited to, said players having cleared predefined levels of the game, said players being first time players, said players having certain characteristics predefined as preferable by the owner, and other such conditions as deemed fit by the owner. In various embodiments, the owner may be allowed to define conditions for accessing the item, either additionally or alternatively to developer-specified conditions. In other embodiments, multiple other conditions may be predefined, which are required to be fulfilled before an item may be made available for access.

In an embodiment, the owner of the item is incentivized for sharing the item with other players. In embodiments, the incentives may include additional game points, enhancements for the in-game experience or other in-game benefits. In embodiments, the person who conditionally accesses the item may earn experience points for accessing or using the item. It should be noted that access conditions may increase the value and desirability of the items, thus incentivizing player engagement and enhancing the entertainment value for the players trying to obtain access to said items.

In an embodiment, the database 120 stores a data structure such as, but not limited to, a table comprising a list of in-game virtual items available for sharing along with the corresponding owners of said items. The data structure may also comprise a time duration for which each of said items may be made available to other players and a corresponding condition which is required to be fulfilled before said item may be made available. In various embodiments, the conditional access module 125 manages the database and updates the inventories of the owner of a virtual item as well as the player to whom the virtual item has been made conditionally available. In various embodiments, each virtual item has a unique product identification code (ID) and each player has a unique gamer ID. When the item is owned by a player, the item's product ID is added to the player's gamer ID. In an embodiment, the conditional access module 125 removes the item's ID from an owner's gamer ID when conditional access to said item is provided to a second player, adds the item's product ID to the second player's gamer ID for a predefined period of time; and upon expiration of said time automatically transfers the item's ID back to the owner's gamer ID. This enables seamless tracking of the virtual item. In an embodiment, each virtual item may also have, associated with it, player reward amounts and the costs associated with conditional access.

FIG. 2 illustrates an exemplary tabular data structure for recording ownership of in-game virtual items, in accordance with an embodiment of the present specification. Table 200 comprises a column 202 for storing metadata or identification codes (IDs) of virtual items, a column 204 for storing corresponding attributes of said items, a column 206 for storing IDs of corresponding owners of the virtual items, a column 208 for storing availability triggers/conditions or a field for encoding availability options corresponding to the items upon fulfillment of which said items may be temporarily used by other players, a column 210 for storing IDs of players temporarily allowed to access the virtual items upon fulfillment of trigger conditions, and a column 212 for storing time durations for which each of said items may be temporarily accessed. It would be apparent that table 200 is just one way of storing the information relating to the virtual items and their accessibility. In an embodiment, table 200 also comprises a column (not shown in FIG. 2) to store an incentive/reward given to an owner for sharing an item with other players, corresponding to each virtual item stored in column 202. In various embodiments various other data structures may be used to record said information. Referring to FIGS. 1 and 2, conditional access module 125 of server 105 is coupled with table 200 stored in database 120, and manages providing conditional accessibility of the stored virtual items to players.

FIG. 3A is a flowchart illustrating the steps of making an in-game virtual item in a video game conditionally available to players of the game, in accordance with an embodiment of the present specification. At step 302, a database of virtual items, owned by at least one first player, that are conditionally accessible to at least one second player is generated, wherein the accessibility is determined based on at least one predefined condition, as described above. In embodiments, virtual items are only shown to those second players that qualify to conditionally access the item.

At step 304, an attribute of an in-game virtual item owned by a first player is modified in order to make other players of a video game aware that said item may be made conditionally available to one or more of said players for a predefined period of time. In embodiments, a color of said item may be changed to a predefined color, or said item made be made to glow or a predefined mark may be clipped on to the item, or special effects (SFX), visual special effects, particle effects may be added to the item. In an embodiment, attributes of the item which affect the attributes of the in-game player character and/or the in-game player character weapons and other ways to earn experience/points within the game by using the item may also be highlighted/advertised. In other embodiments, the owner of the item may make announcements or advertisements to inform other players of the conditional availability of the item. In embodiments a descriptor advertising item availability along with predefined fulfillment condition(s) may be added to the items description. In an embodiment, said item may be marked as available for a predefined period of time in an inventory of the player owning the item. In other embodiment, said item may be added to a list of items available for conditional use, wherein the list can be accessed by all the players of the video game.

At step 306, at least one second player fulfills at least one access condition in order to trigger or enable their access and obtain said item for said period of time. In some embodiments an access condition may comprise, but is not limited to, payment of an amount of money/in-game currency in order to obtain the item for a predefined period of time. In an embodiment, the amount of money is established by the game developer. In an embodiment, the amount of money may be set by the owner of the virtual item, who may provide limited time offers as well as other advanced pricing options for accessing the item. In some embodiments, the amount of money that is charged for a virtual item is system-controlled via in-game menus for price-setting and placing said items in a marketplace. In some embodiments, the marketplace may be part of the outside game world. In some embodiments, the marketplace may be an in-game feature and part of the virtual world, such as a virtual merchant's shop. In an embodiment, the system may provide an environment for setting up an auction for accessing the item, when the item is coveted by more than one players; wherein a minimum bid, a reserve price, and a buyout price may be predefined by the system or dynamically controlled by the owner.

At step 308, the item is made accessible to the one or more players that have fulfilled said conditions for the predefined period of time. In an embodiment, during said period the item is not available for use to the first player (owner of said item). When the item is owned by a player, the item's product ID is coupled with the player's gamer ID. In an embodiment, when conditional access to said item is provided to a second player, the item's ID is removed from the owner's gamer ID and is coupled with the second player's gamer ID for the predefined period of time. Upon expiration of the predefined period of time, the item's ID is automatically transferred back to the owner's gamer ID.

At step 310, the inventories of the first player and said one or more players are modified to reflect said accessibility of the item for the limited time duration. In embodiments, a player's inventory items are stored in a database structure and linked to the player's profile via a reference embedded in an associated cell. In embodiments, changes are made in said inventory data structure of the first player to indicate that the item is no longer available for use by the first player. In embodiments, changes are made in the inventory data structure of the second player to whom the item has been made accessible indicating that the item is possessed by the second player for the predefined time period.

At step 312, it is determined if the time period has elapsed, and if the time has not elapsed the game proceeds as before at step 316. In an embodiment, a first current time when the one or more players are provided access to the item is recorded and is continuously compared with a current time to determine if the predefined period has elapsed. Lapse of the predefined period occurs when a difference between a current time and the recorded first current time becomes equal to the predefined period of time. In one embodiment, the determination of the elapsed time period is effectuated by using a system countdown timer tied with the item's product ID. In various embodiments, the system countdown timer is based on Coordinated Universal Time (UTC).

At step 313, if said time period has elapsed, the accessibility of the item is withdrawn from the one or more players. At step 314 the inventories of the first player and said one or more players are modified to reflect said withdrawn accessibility.

In an embodiment, the method of providing conditional access to virtual items may be implemented by using a block chain technique. In an embodiment, when a conditional access to an item is provided to a player, the event is published to a ledger via block chain technology so that said event is available to all the players of the game. In an embodiment, instead of storing the events in a centralized backend server, said events are stored on a distributed ledger system.

Figure 3B:
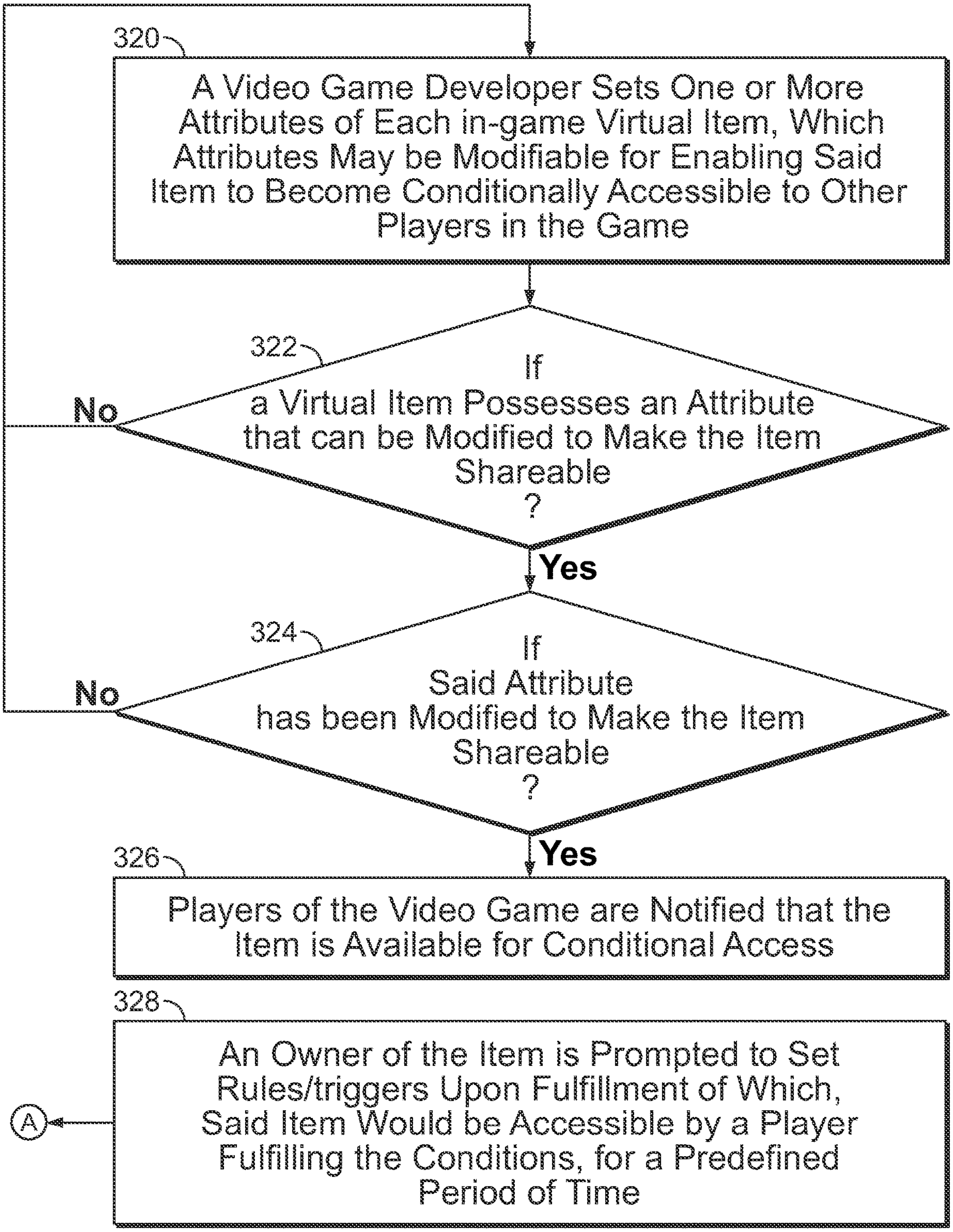
FIG. 3B is a flowchart illustrating the steps of making an in-game virtual item in a video game conditionally available to players of the game, in accordance with another embodiment of the present specification.
Figure 3B:
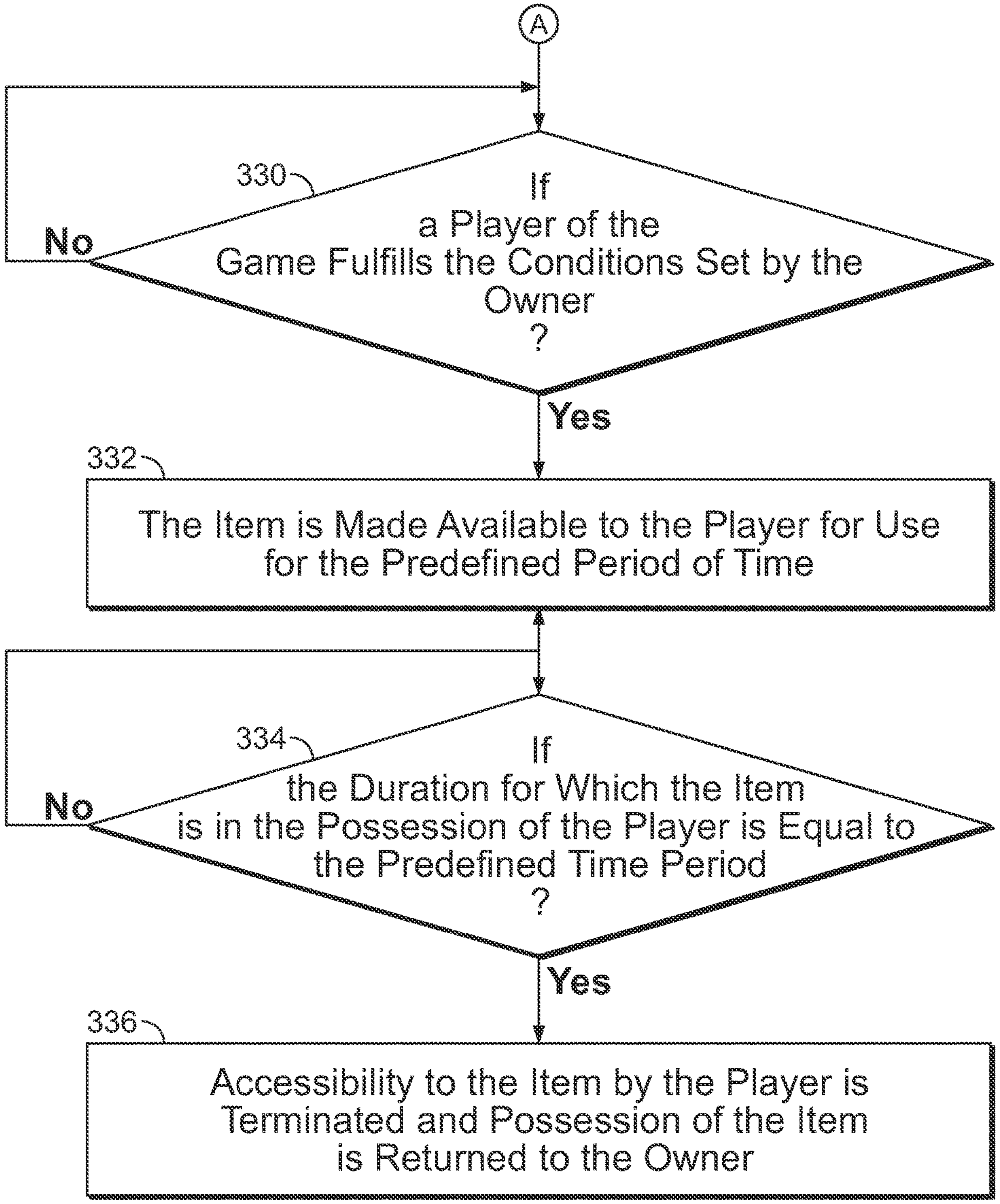

FIG. 3B is another flowchart illustrating the steps of making an in-game virtual item in a video game conditionally available to players of the game, in accordance with an embodiment of the present specification. At step 320, a video game developer (i.e. the entity responsible for managing the game servers, gaming code, and other technologies required to actually operate the game on-line), sets one or more attributes of each in-game virtual item. These attributes may be modified by the developer to either make each item shareable or non-shareable. In an embodiment, an owner of the item may be enabled to modify one or more predefined attributes of the item based upon predefined conditions defined by the developer.

At step 322 it is determined if a virtual item possesses an attribute that can be modified to make the item shareable. At step 324 if the item possesses an attribute that can be modified to make the item shareable, it is determined if said attribute has been modified to make the item shareable. At step 326 if the attribute has been modified to make the item shareable, players of the video game are notified that the item is available for conditional access. At step 328, an owner of the item is prompted to set rules/triggers upon fulfillment of which, said item would be accessible by a player fulfilling the conditions, for a predefined period of time. At step 330 it is determined if a player of the game fulfills the conditions set by the owner of the virtual item. At step 332, if the conditions are fulfilled by the player, the item is made available to the player for use for the predefined period of time. At step 334, it is determined if the duration for which the item is in the possession of the player is equal to the predefined time period. At step 336, if the duration is equal to the predefined time period, accessibility to the item by the player is terminated and possession of the item is returned to the owner. Each step of FIG. 3B is explained in detail with respect to FIGS. 4A, 4B, 4C, 5A, 5B, 6A, 6B, 7A, 7B, 8A and 8B.

Figure 4A:
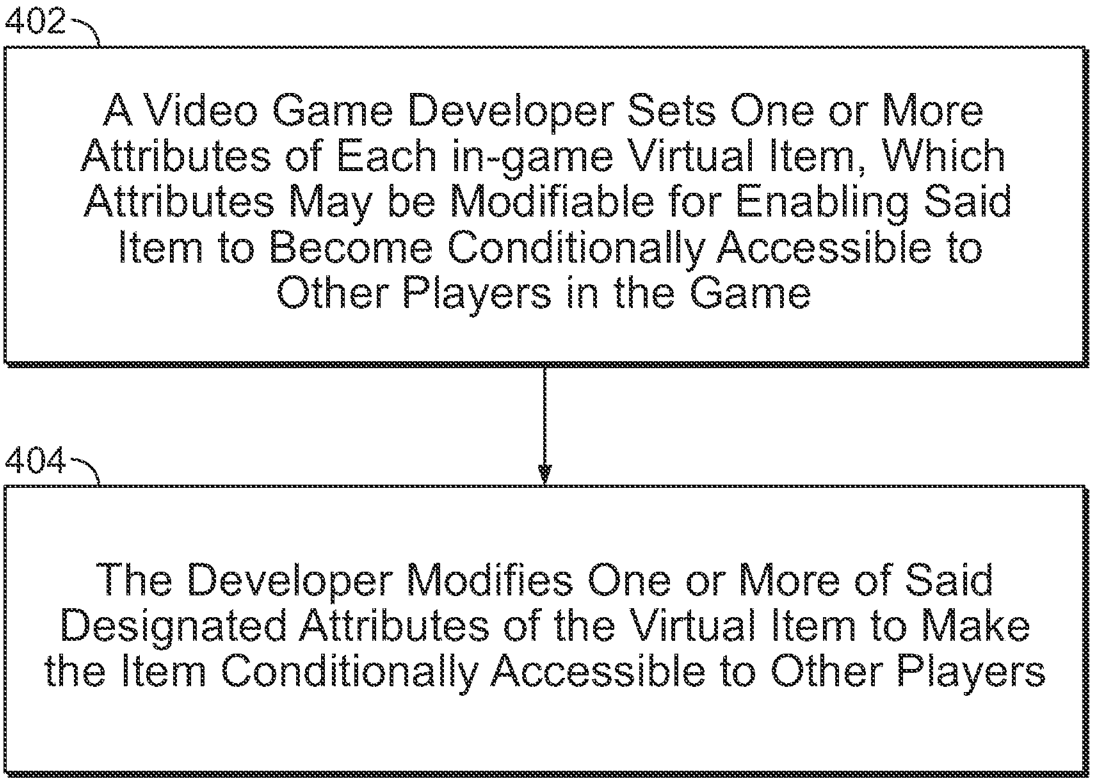
FIG. 4A is a flowchart illustrating the steps of designating one or more attributes of an in-game item that may be modified for causing the item to be conditionally accessible, in accordance with an embodiment of the present specification.

FIG. 4A is a flowchart illustrating the steps of designating one or more attributes of an in-game item that may be modified for causing the item to be conditionally accessible, in accordance with an embodiment of the present specification. In various embodiments, at step 402 a video game developer (i.e. the entity responsible for managing the game servers, gaming code, and other technologies required to actually operate the game on-line), sets one or more attributes of each in-game virtual item. In embodiments, the attributes may be modifiable to enable said item to become conditionally accessible to other players in the game. In other embodiments, the attributes may be modifiable by an owner of the item in the game to enable said item to become conditionally accessible to other players in the game. In various embodiments, these attributes are not player specific and apply generally to the in-game item itself. At step 404, the developer modifies one or more of said designated attributes to make the item conditionally available or accessible to players other than the owner of the virtual item. For example, for a virtual weapon being used in the game, one or more attributes may be designated by the game developer as modifiable to make the weapon conditionally available to other players. The developer of the weapon can make that weapon shareable, by modifying the one or more attributes such as, but not limited to, shareable on an upcoming weekend, shareable if the owner has passed a particular level, etc. In an embodiment, a color of said item may be changed to a predefined color, or said item made be made to glow or a predefined mark may be clipped on to the item. In embodiments a descriptor attribute of an item advertising item availability along with predefined fulfillment condition (s) may be designated as modifiable by the developer. In an embodiment, said item may be marked as shareable for a predefined period of time in an inventory of the player owning the item.

Figure 4B:
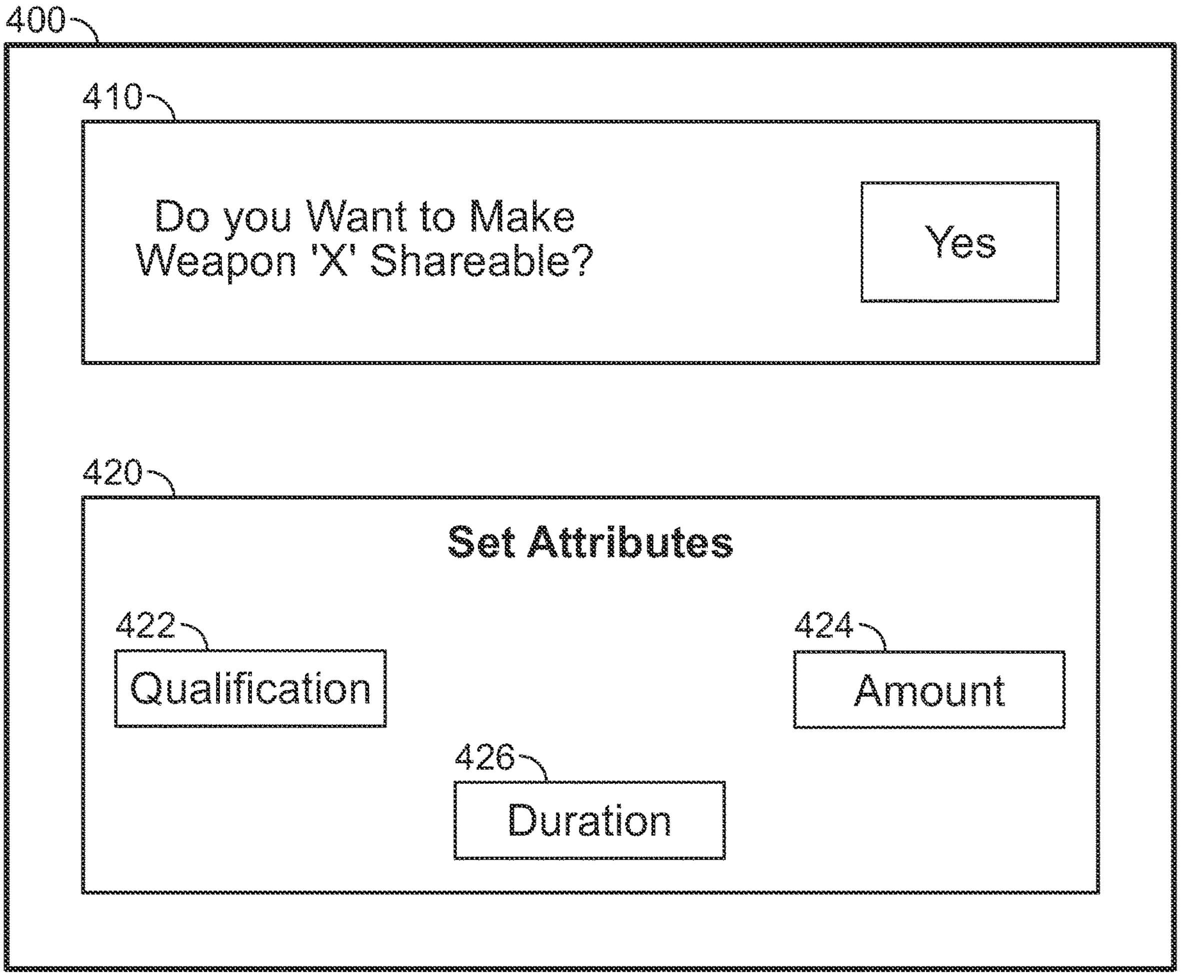
FIG. 4B is an exemplary GUI for setting one or more attributes of an in-game item for causing the item to be conditionally accessible, in accordance with an embodiment of the present specification.

FIG. 4B is an exemplary GUI for setting one or more attributes of an in-game item for causing the item to be conditionally accessible, in accordance with an embodiment of the present specification. As shown a developer of a virtual item such as a particular weapon 'X' may be prompted to make the weapon shareable at 410, and may set attributes of the weapon defining the conditions and time period for conditional accessibility of the weapon. If the developer selects 'yes' at 410, the developer is prompted to set attributes at 420. In the example shown in FIG. 4B, the developer may set a qualification 422 of an accessing player such as for example, that the weapon would be temporarily accessible to other players only after the players have reached a predefined game level, and a minimum (and in some embodiments, a maximum) amount 424 which must be paid by an accessing player. The developer may also modify an attribute to set a minimum (and in some embodiments, a maximum) time period for which the weapon would be shareable at 426.

FIG. 4C illustrates an exemplary tabular data structure for recording attributes of in-game virtual items, in accordance with an embodiment of the present specification. Table 400 comprises a column 430 for storing metadata or identification codes (IDs) of virtual items, a column 432 for storing corresponding attributes of said items such as but not limited to: a time of availability of the item for sharing, a color change of the item showing that it is temporarily accessible, a change in the descriptor of the item showing that it is temporarily accessible, an amount of money payable for gaining access to the item, and a reward/incentive available to the owner of the item upon making the item conditionally accessible to other players.

Figure 5A:
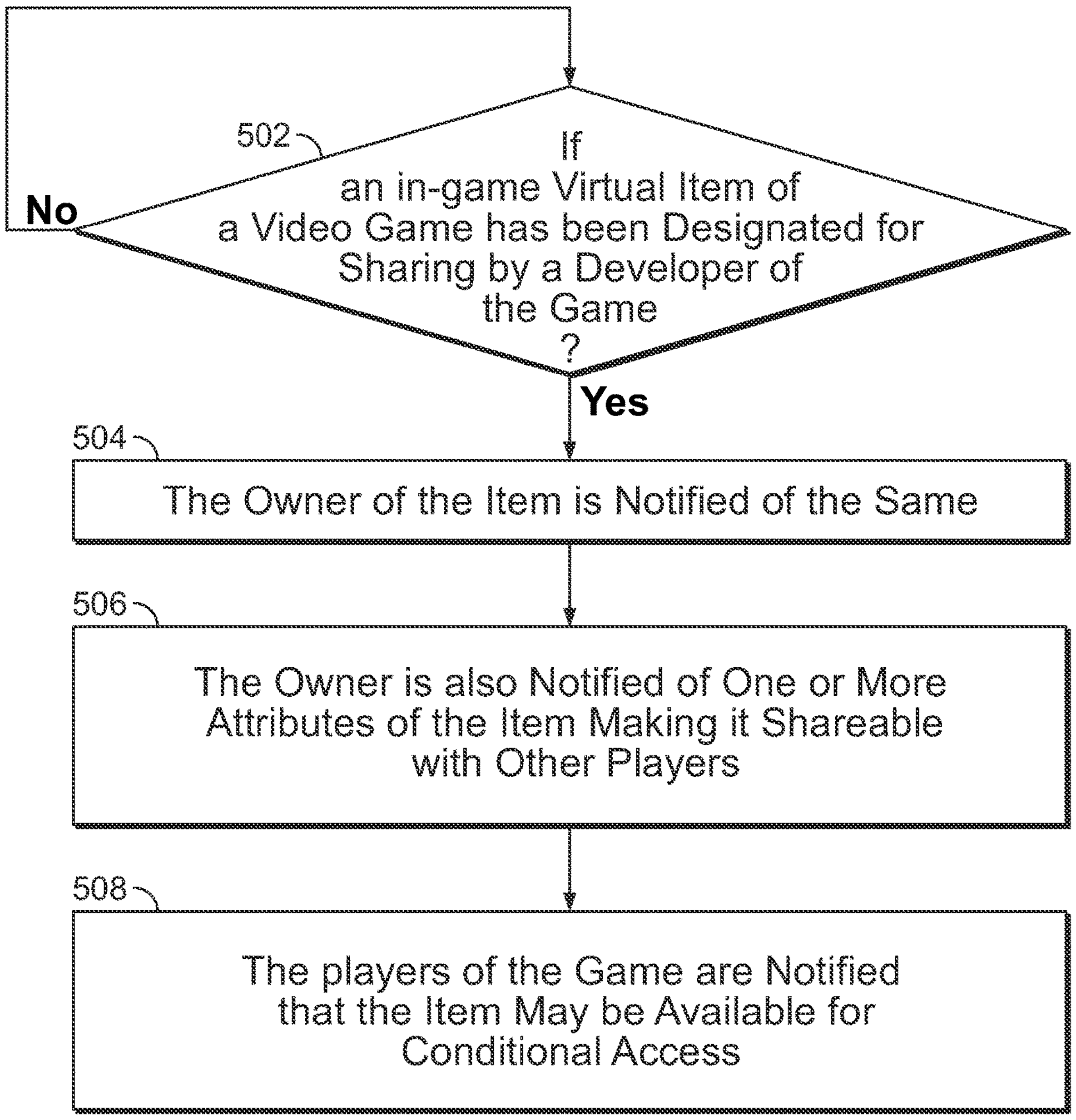
FIG. 5A is a flowchart illustrating the steps of notifying the players of a video game that an in-game virtual item is conditionally accessible, in accordance with an embodiment of the present specification.

FIG. 5A is a flowchart illustrating the steps of notifying the players of a video game that an in-game virtual item is conditionally accessible, in accordance with an embodiment of the present specification. At step 502, it is determined if an in-game virtual item of a video game has been designated for sharing by a developer of the game. At step 504, if the item has been designated for sharing, the owner of the item is notified. In an embodiment, the owner is also notified of the one or more attributes of the item making it shareable with other players at step 506. For, example, if the item may be made conditionally available to other players only on weekends, the owner may be reminded via messages/pop-ups when a weekend arrives. The owner, as described with respect to FIGS. 6A and 6B, may set up rules/triggers for allowing conditional access to the players of a video game of an in-game virtual item. Once this is done, at step 508, the players of the game are notified that the item is available for conditional access. For example, a color of said item may be changed to a predefined color, or said item made be made to glow or a predefined mark may be clipped onto the item. In other embodiments, the owner of the item may make announcements or advertisements to inform other players of the conditional availability of the item. In some embodiments a descriptor advertising item availability along with predefined fulfillment condition(s) may be added to the items description. In other embodiments, said item may be added to a list of items available for conditional use, wherein the list can be accessed by all the players of the video game.

Figure 5B:
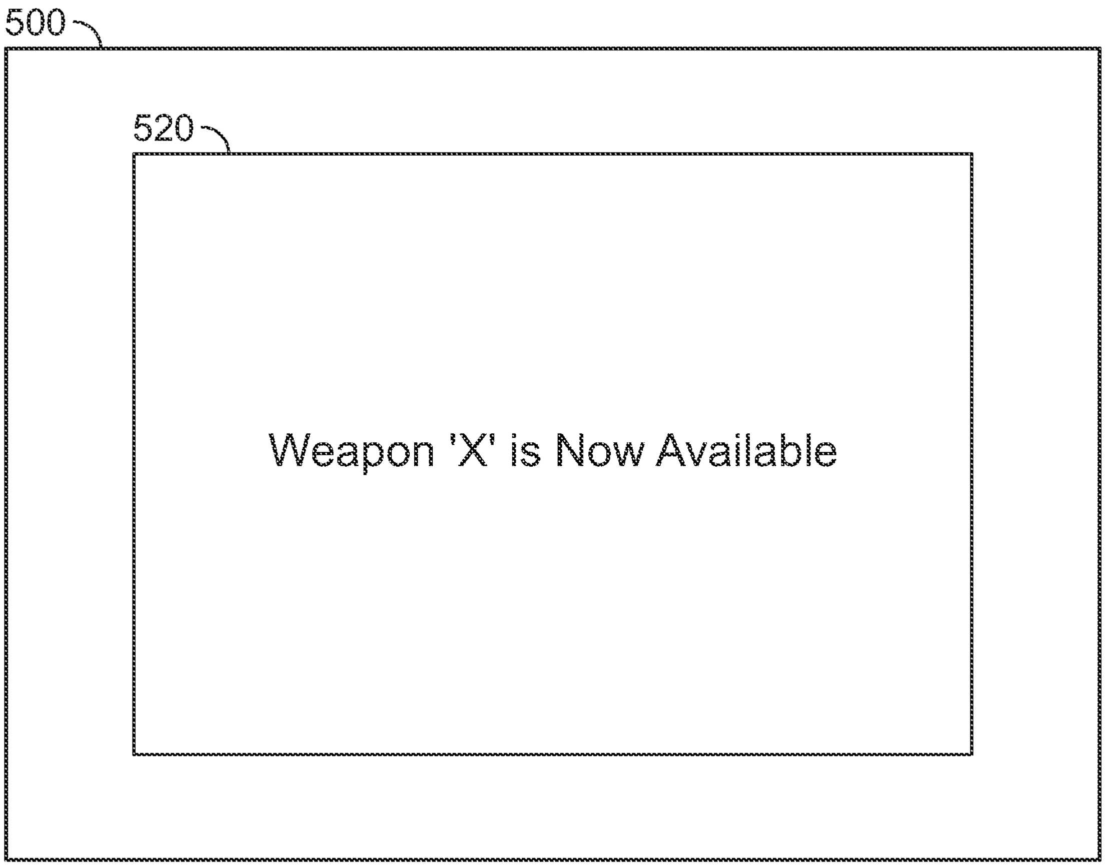
FIG. 5B is an exemplary GUI for notifying the players of a video game that at least one in-game virtual item is conditionally accessible, in accordance with an embodiment of the present specification.

FIG. 5B is an exemplary GUI for notifying the players of a video game that at least one in-game virtual item is conditionally accessible, in accordance with an embodiment of the present specification. As shown in screenshot 500 a pop-up message 520 informs the players that a weapon 'X' is now available.

Figure 6A:
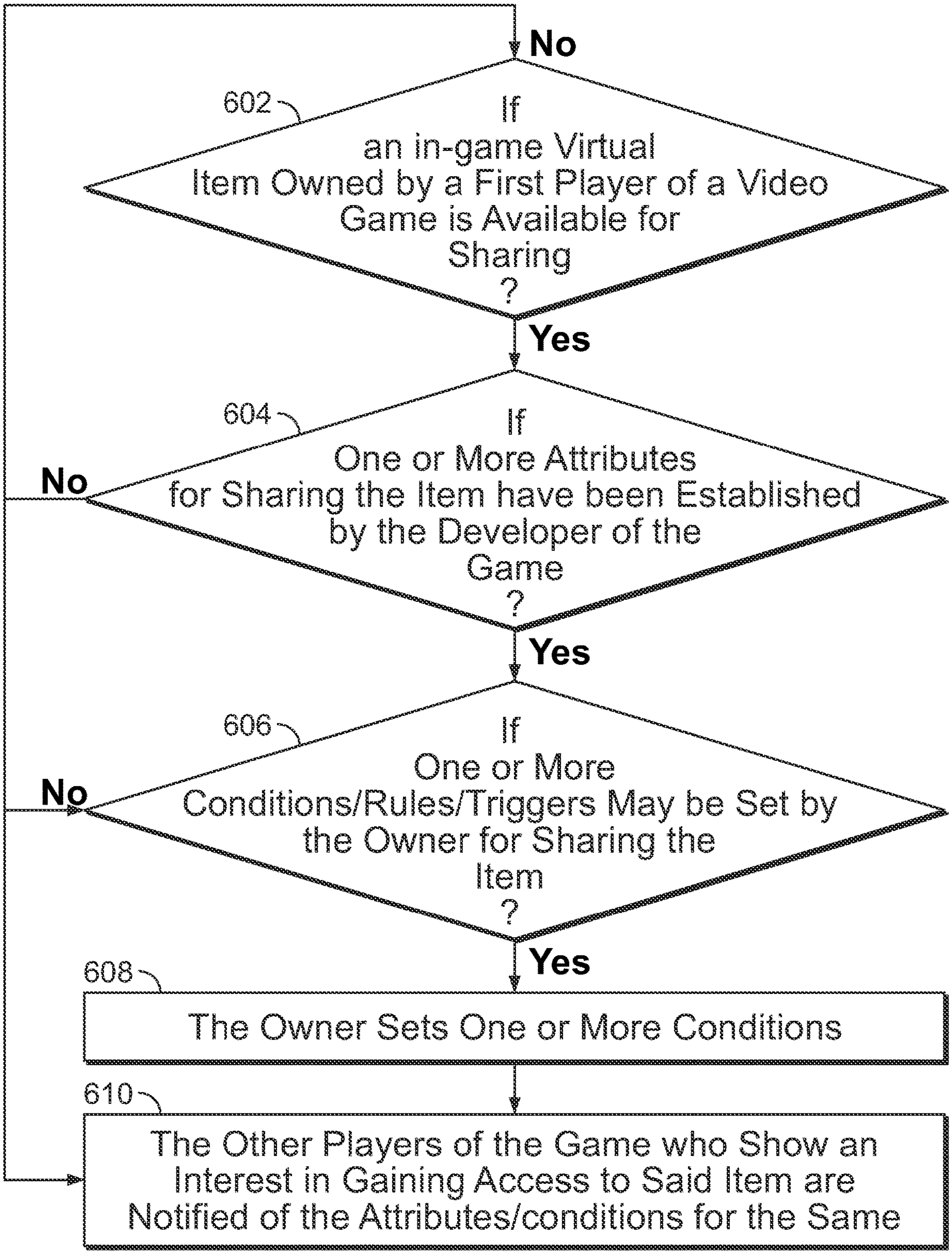
FIG. 6A is a flowchart illustrating the steps of setting up rules/triggers for allowing conditional access to the players of a video game of an in-game virtual item, in accordance with an embodiment of the present specification.

FIG. 6A is a flowchart illustrating the steps of setting up rules/triggers for allowing conditional access to the players of a video game of an in-game virtual item, in accordance with an embodiment of the present specification. At step 602 it is determined if an in-game virtual item owned by a first player of a video game is available for sharing. At step 604 if the item is available for sharing, it is determined if one or more attributes for sharing the item have been set by the developer of the game. In various embodiments, the developer may establish one or more prerequisites (as described above) for gaining conditional access to a virtual item. For example, a particular in game weapon may only be accessed by players who have achieved a particular level of the game. Other pre-conditions may comprise a minimum pre-defined amount of virtual money that must be paid to the owner for accessing the item or a predefined time minimum period for which the item may be accessed by the players. At step 606 if one or more attributes for sharing the item have been established by the developer of the game, it is determined if one or more conditions/rules/triggers may be set by the owner for sharing the item. At step 608, if one or more conditions/rules/triggers may be set by the owner for sharing the item, the owner may set one or more conditions. For example, the owner may set the amount of money payable for gaining access to the item, or set the time period for which the item would be accessible. The owner may also set desired pre-qualifications of players who would be granted temporary access to the item. At step 610, the other players of the game who show an interest in gaining access to said item are notified of the prerequisite conditions.

Figure 6B:
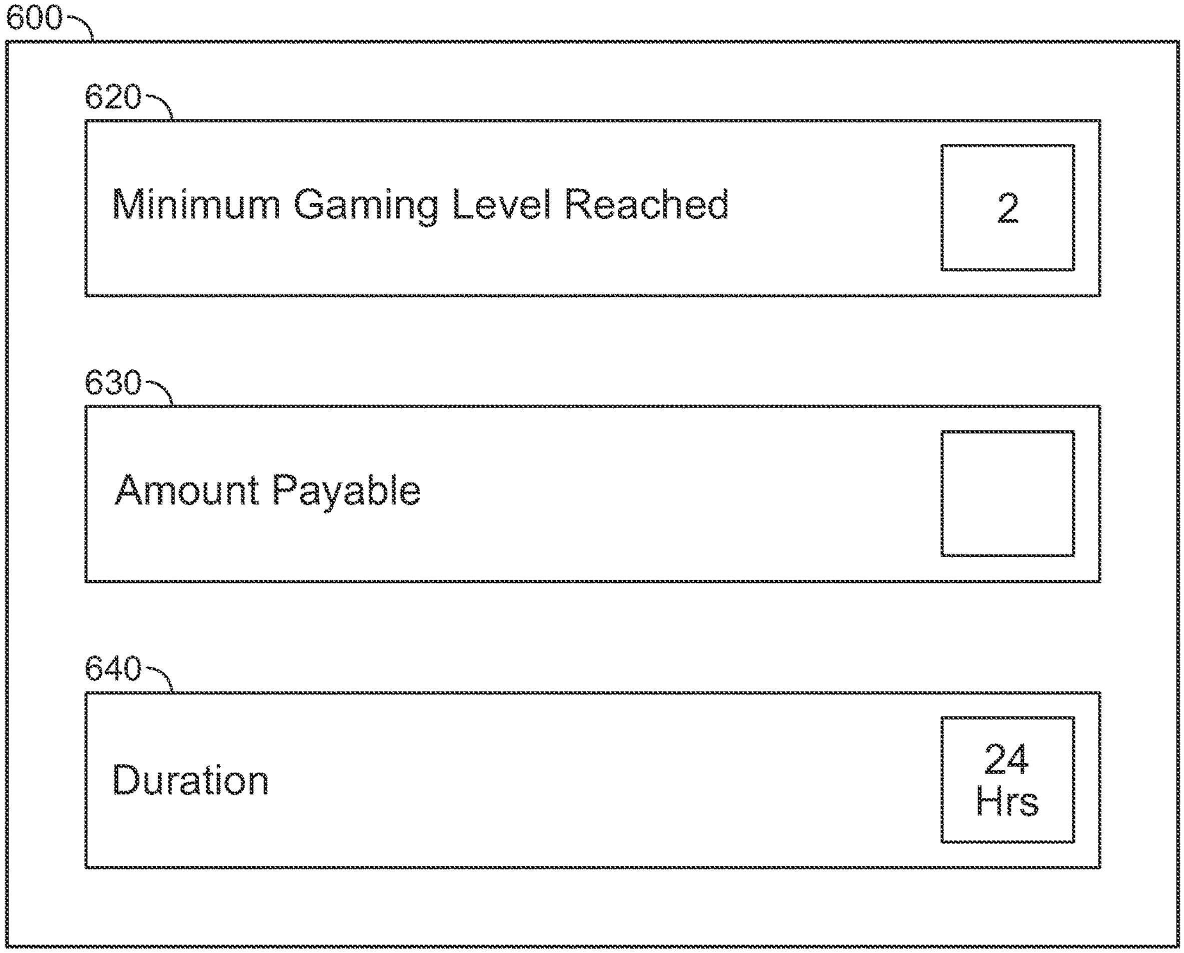
FIG. 6B is an exemplary GUI for setting up rules for gaining conditional access to an in-game virtual item by the owner of the item in a video game, in accordance with an embodiment of the present specification.

FIG. 6B is an exemplary GUI for setting up rules for providing conditional access to an in-game virtual item by the owner of the item in a video game, in accordance with an embodiment of the present specification. As shown in screenshot 600, at 620, 630 and 640 the owner can define a minimum game level reached by players who can be granted access, an amount of money payable for gaining access, and a time period for which the item would be accessible for said amount of money to the players who have reached said gaming level. In an embodiment, the owner may decline a request for making an item conditionally accessible to other players a predefined number of times. In another embodiment, the owner of the item may modify one or more predefined attributes of the item based upon predefined conditions defined by the developer of the game.

Figure 7A:
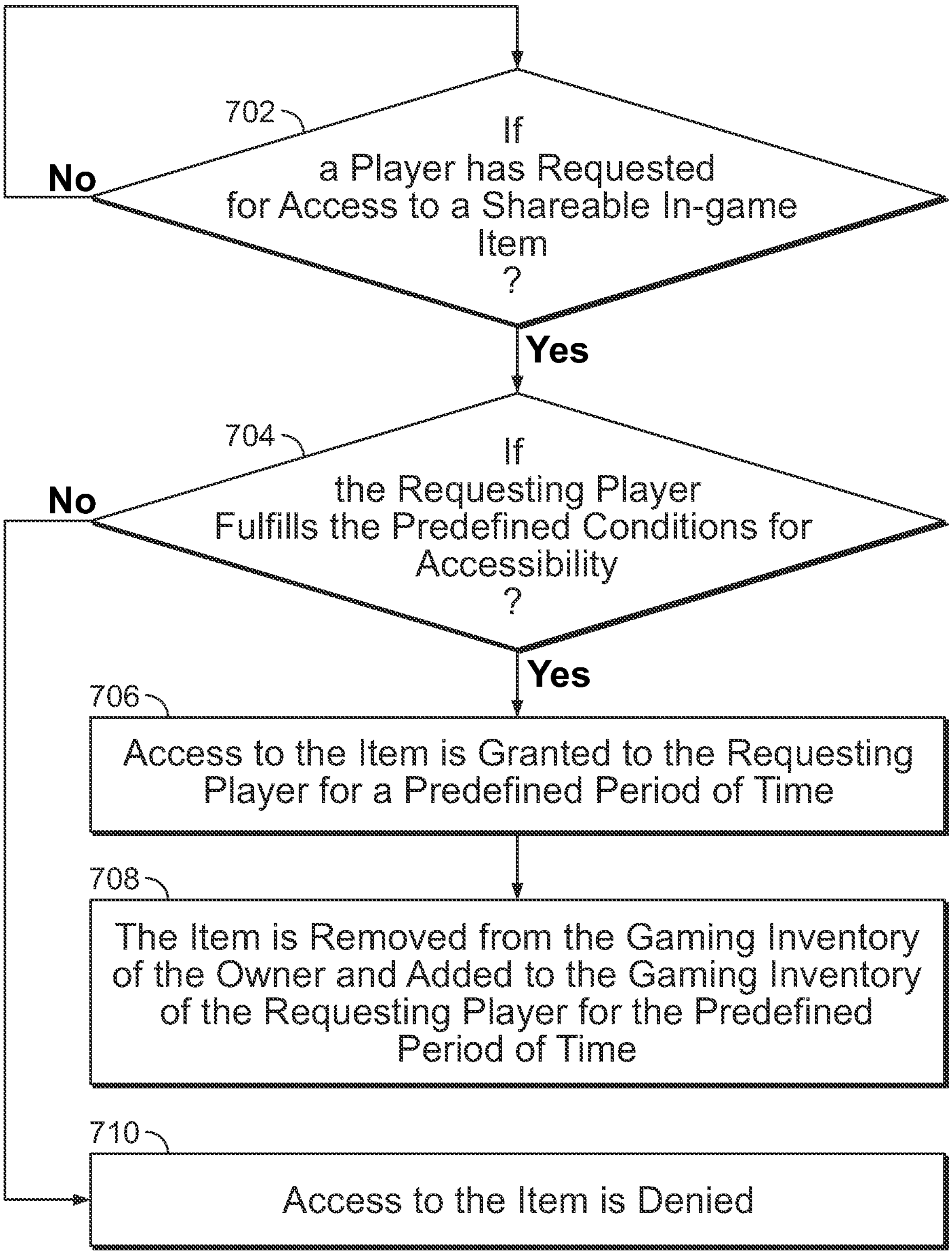
FIG. 7A is a flowchart illustrating the steps of allowing access to an in-game virtual item to one or more players upon fulfillment of one or more predefined conditions, in accordance with an embodiment of the present specification.

FIG. 7A is a flowchart illustrating the steps of allowing access to an in-game virtual item to one or more players upon fulfillment of one or more predefined conditions, in accordance with an embodiment of the present specification. In embodiments, once players are notified of the availability of an item for conditional access such as described above, one or more players may request access to the item from the owner. At step 702, it is determined if a player has requested conditional access to a virtual in-game item. The request may be made via an in-game chat window, via a broadcast message or via personal message to the owner or any other suitable method. At step 704 upon receiving a request for the item, it is determined by the owner if the requesting player fulfills the predefined conditions for accessibility. Some of said conditions have been described above with reference to FIG. 6A. If it is determined that the requesting player has fulfilled said conditions, then at step 706, access to the item may granted to the requesting player for a predefined period of time. At step 708, the item is removed from the gaming inventory of the owner and added to the gaming inventory of the requesting player for the predefined period of time. At step 710, if the conditions are not fulfilled by the requesting player, access to the item is denied.

Figure 7B:
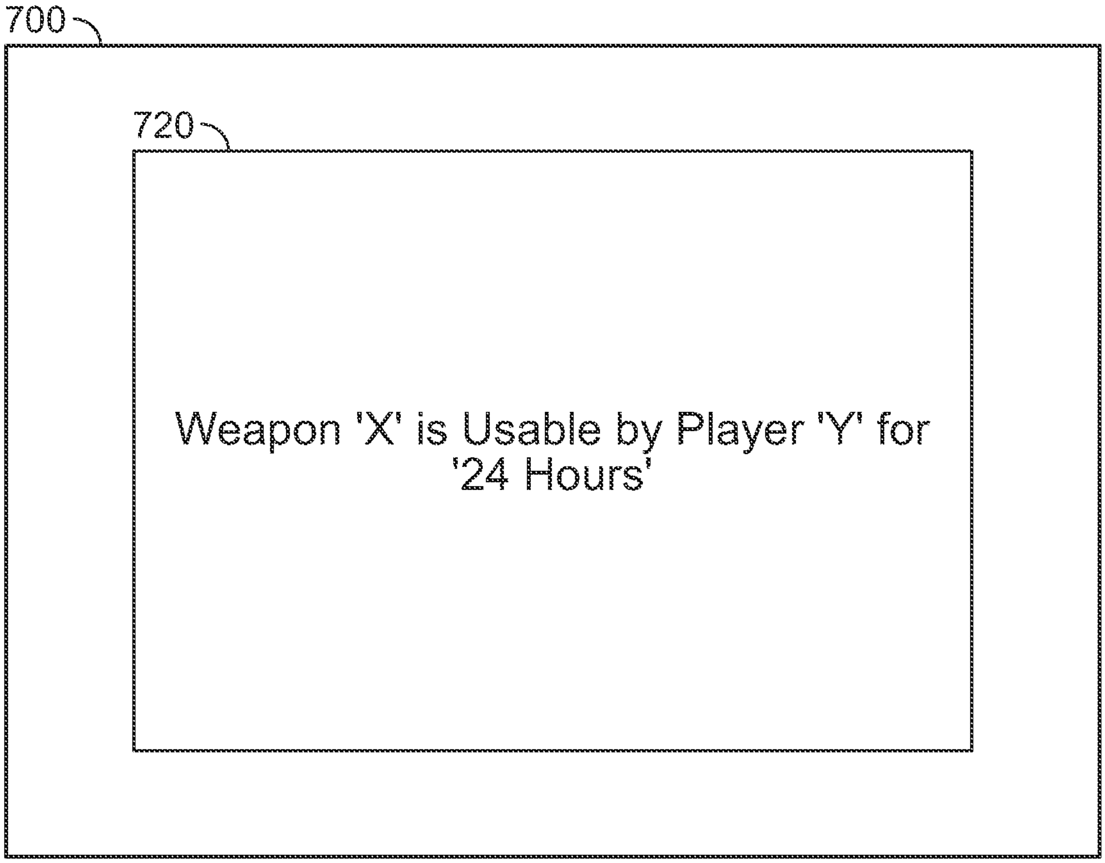
FIG. 7B is an exemplary GUI showing that an in-game item is accessible to a player of a video game who is not the owner of said item, in accordance with an embodiment of the present specification.

FIG. 7B is an exemplary GUI showing that an in-game item is accessible to a player of a video game who is not the owner of said item, in accordance with an embodiment of the present specification. As shown in screen shot 700, a notification 702 that a weapon 'X' is usable by a player 'Y' for a predefined time period such as '24 hours' is displayed to the players of the video game.

Figure 8A:
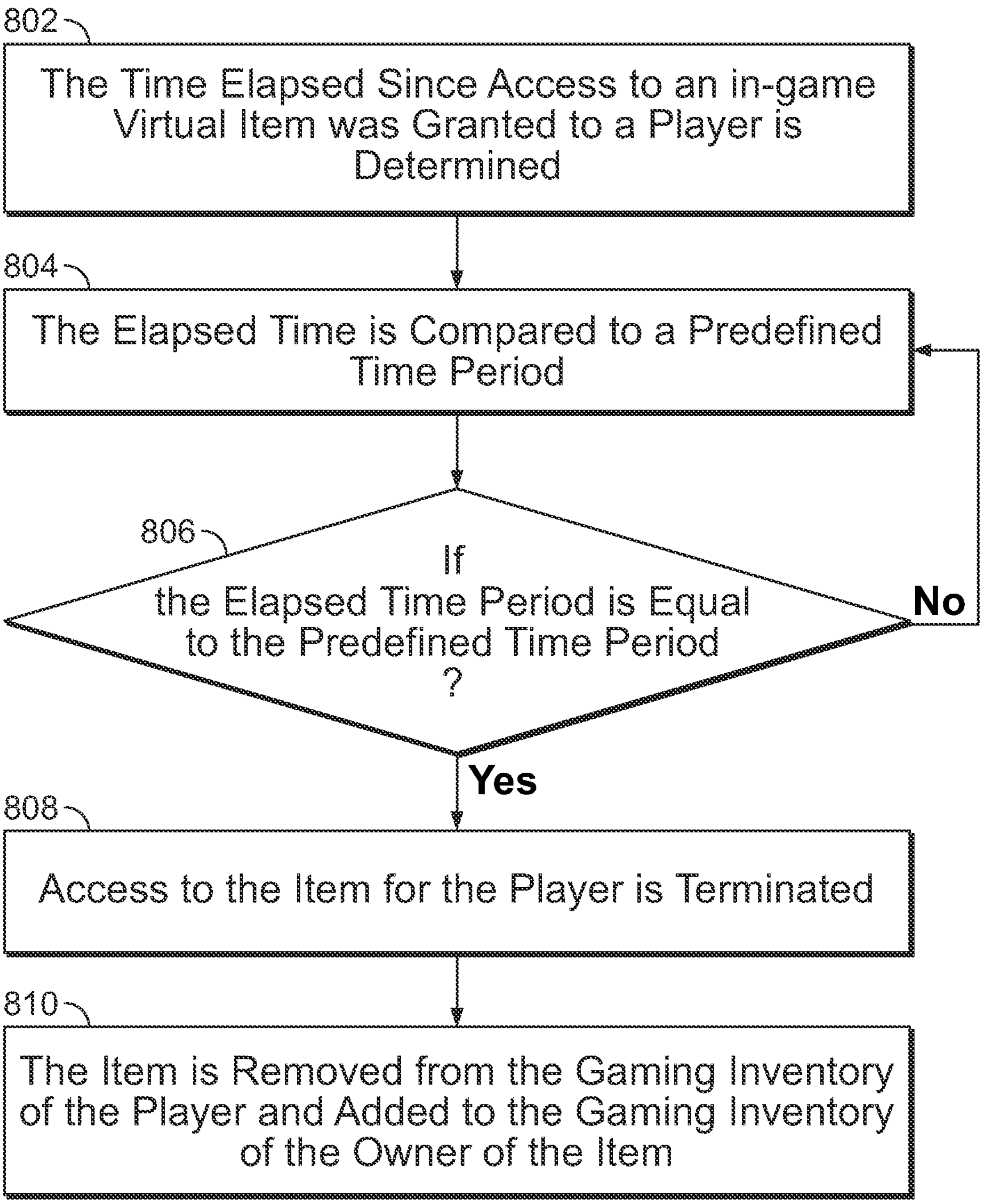
FIG. 8A is a flowchart illustrating the steps of terminating access to an in-game item after expiry of a predefined period, in accordance with an embodiment of the present specification.

FIG. 8A is a flowchart illustrating the steps of terminating access to an in-game item after the expiry of a predefined period, in accordance with an embodiment of the present specification. At step 802 it is determined how much time has elapsed since access to an in-game virtual item was granted to a player. At step 804 the elapsed time is compared to a predefined time period. At step 806 it is determined if the elapsed time period is equal to the predefined time period. At step 808, if the elapsed time period is equal to the predefined time period, access to the item is terminated. At step 810 the item is removed from the gaming inventory of the player and added back to the gaming inventory of the owner of the item.

Figure 8B:
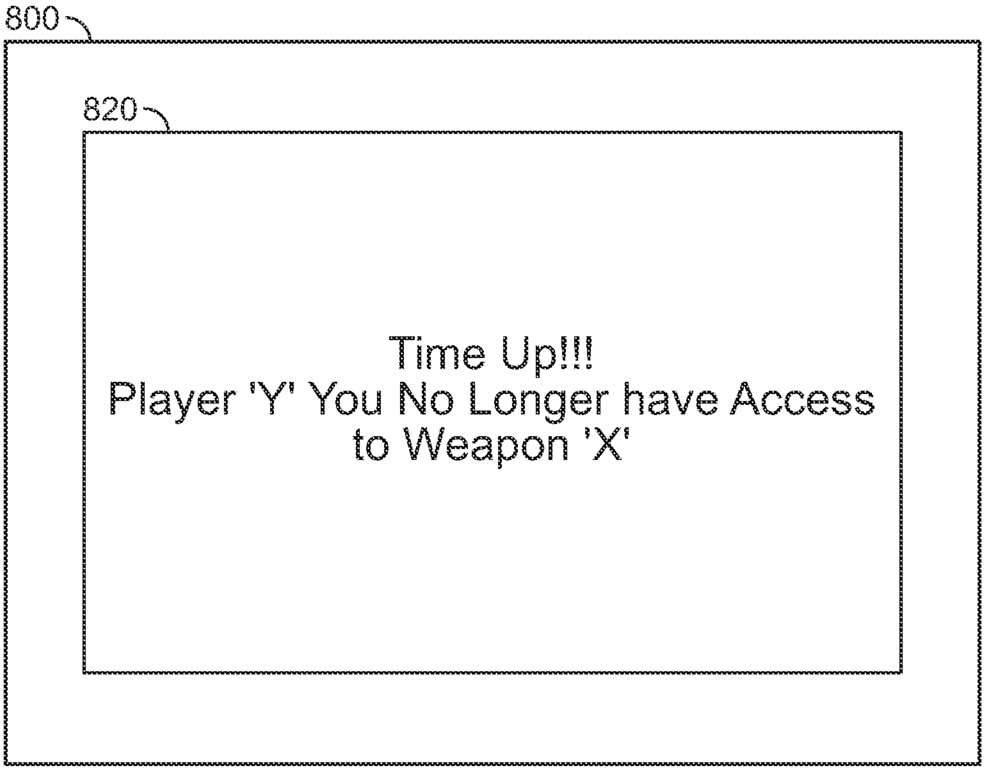
FIG. 8B is an exemplary GUI showing that access to an in-game item is terminated for a player of a video game who is not the owner of said item, in accordance with an embodiment of the present specification.

FIG. 8B is an exemplary GUI showing that access to an in-game item is terminated for a player of a video game who is not the owner of said item, in accordance with an embodiment of the present specification. As shown in screen shot 800, a notification 802 that a time period for accessing weapon 'X' by a player 'Y' has elapsed is displayed to the players of the video game.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

I claim:

1. A computer-implemented method for managing conditional access to a virtual gaming item within a multiplayer video game environment comprising a plurality of concurrently executing game instances hosted by at least one server, the method comprising:

using the at least one server, generating a virtual gaming item configured for use within the video game, wherein the virtual gaming item is assigned to a first player and is associated with a unique product identifier stored in a game database;

creating, within an electronically stored data structure in the game database, a record of the virtual gaming item including metadata comprising the item's attributes, an identifier of the first player, one or more predefined conditions for access, and a time duration for temporary access;

receiving, from a plurality of remote client devices associated with respective players and in communication with the at least one server over a multiplayer video game network, generating gameplay data during real-time execution of the video game;

monitoring using a conditional access module executed by the at least one server, evaluating the gameplay data of a second player to determine whether the second player satisfies the one or more predefined conditions associated with the virtual gaming item, wherein the one or more predefined conditions comprises at least one of reaching a specified gameplay level and transferring a predefined amount of virtual value to the first player;

upon determining that the second player has satisfied the one or more predefined conditions, modifying the game database to update the data structure by adding the second player's identifier, recording a start time associated with granting access, modifying the inventory of the second player to include the virtual gaming item for the temporary access time duration, and updating the inventory of the first player to reflect inaccessibility of the virtual gaming item during the temporary access time duration;

broadcasting a notification to the second player via a graphical user interface that the virtual gaming item is accessible;

recording a countdown or elapsed time since the start time;

upon determining that the temporary access time duration has elapsed, revoking the second player's access to the virtual gaming item, restoring the virtual gaming item to the inventory of the first player, and updating the data structure to reflect a termination of access and a restored status of the item to the first player; and publishing, to a distributed ledger implemented using a blockchain network, a transaction entry indicating that the virtual gaming item was temporarily made accessible to the second player and that access was subsequently revoked.

2. The method of claim 1, wherein the one or more predefined conditions are each input by the first player.

3. The method of claim 1, further comprising generating data indicative of the graphical user interface using the at least one server.

4. The method of claim 3, further comprising prompting the first player to provide, to the second player, conditional access to the virtual gaming item that is assigned to the first player by using the graphical user interface.

5. The method of claim 4, further comprising receiving from the first player a consent to provide conditional access to the virtual gaming item to the second player via the graphical user interface.

6. The method of claim 5, further comprising prompting the first player to input one or more of the attributes of the virtual gaming item, wherein the attributes define one or more conditions for accessing the virtual gaming item by the second player using the graphical user interface.

7. The method of claim 6, wherein the attributes are at least indicative of the temporary access time duration for which the virtual gaming item is conditionally accessible.

8. The method of claim 6, wherein the attributes of the virtual gaming item comprises at least one of a color of the virtual gaming item and a descriptor of the virtual gaming item.

9. The method of claim 3, further comprising notifying the first player that the virtual item is being made accessible to the second player for the temporary access time duration using the graphical user interface.

10. The method of claim 1, wherein the multiplayer video game is provided by a computer system comprising the at least one server having a processor and configured to host the plurality of concurrently executing game instances of video game applications.

11. The method of claim 10, wherein the at least one server is configured to host a plurality of remote client devices associated with respective players wherein the at least one server is in communication with the plurality of remote client devices over a multiplayer video game network.

12. The method of claim 11, wherein the at least one server is further configured to perform a series of programmatic steps adapted to generate electronic user interfaces that present a plurality of scenarios for providing conditional access to the virtual gaming item to a second player of the video game.

13. The method of claim 1, further comprising, using the at least one server, modifying a data structure associated with the second player to reflect the virtual gaming item's inaccessibility to the second player.

14. The method of claim 1, wherein providing access to the virtual gaming item to the second player comprises modifying a data structure associated with the virtual gaming item to record a start time associated with granting access a first time using the at least one server.

15. The method of claim 14, further comprising determining whether the temporary access time duration has elapsed by acquiring a current time and determining a difference between the current time and the start time.

16. The method of claim 14, further comprising terminating conditional accessibility to the virtual gaming item for the second player based on the difference between the current time and the start time, wherein the difference is equal to or greater than the temporary access time duration.

17. The method of claim 1, wherein the one or more predefined conditions comprise reaching a predefined gaming level by the second player.

18. The method of claim 1, wherein the one or more predefined conditions comprise a transfer of the predefined amount of virtual value to the first player by the second player.

19. The method of claim 1, further comprising determining if a predefined percentage of a total number of the conditionally accessible virtual gaming items in the video game has been obtained by a total player population playing the video game before prompting at least the first player to provide conditional access to at least the virtual gaming item that is allocated to the first player.

* * * * *